United States Patent [19]

Yamauchi et al.

[11] Patent Number: 5,457,443
[45] Date of Patent: Oct. 10, 1995

[54] MULTIFUNCTIONAL COMBINATION SWITCH

[75] Inventors: Kanji Yamauchi; Akio Kurihara; Yoshiyuki Mizuno, all of Shizuoka, Japan

[73] Assignee: Yazaki Corporation, Japan

[21] Appl. No.: 40,379

[22] Filed: Mar. 30, 1993

[30] Foreign Application Priority Data

Mar. 30, 1992 [JP] Japan .................... 4-026129 U
Mar. 31, 1992 [JP] Japan .................... 4-026560 U

[51] Int. Cl.$^6$ ........................................ H01H 9/00
[52] U.S. Cl. .................. 340/825; 200/4; 200/5 EA; 200/175; 250/200
[58] Field of Search .............. 340/825; 341/13, 341/16, 20, 31, 33; 200/244, 252, 61.27, 6 A, 61.54, 61.3, 61.34, 61.35, 4, 5 EA, 175; 250/200

[56] References Cited

U.S. PATENT DOCUMENTS

| | | | |
|---|---|---|---|
| 4,273,971 | 6/1981 | Tregurtha | 200/61.54 |
| 4,408,103 | 10/1983 | Smith, III . | |
| 5,134,350 | 6/1992 | Mahoney . | |
| 5,267,799 | 12/1993 | Nukada . | |

FOREIGN PATENT DOCUMENTS

| | | |
|---|---|---|
| 57-103242 | 6/1982 | Japan . |
| 58-40445 | 3/1983 | Japan . |
| 61-144552 | 9/1986 | Japan . |
| 62-26842 | 2/1987 | Japan . |
| 343866 | 9/1988 | Japan . |
| 1109445 | 7/1989 | Japan . |
| 279534 | 6/1990 | Japan . |
| 2137724 | 11/1990 | Japan . |

Primary Examiner—Donald J. Yusko
Assistant Examiner—Gregg V. Miller
Attorney, Agent, or Firm—Wigman, Cohen, Leitner & Myers

[57] ABSTRACT

A combination switch for performing various functions comprises a fixed substrate having an output contact assembly which has a common output contact and other output contacts which are electrically insulated from the common output contact. The switch also comprises a movable substrate having a switch contact assembly which has a common contact and other contacts which are electrically connected to the common contact. A switch lever is for moving the movable substrate with respect to the fixed substrate to shift the switch contact assembly relative to the output contact assembly, thereby selectively connecting the common output contact to the output contacts through the switch contact assembly to supply from the output contact assembly a pattern signal indicative of one of different conductive patterns. A processor judges, in response to the pattern signal, to which function the conductive pattern corresponds and producing an operational signal for performing the indicated function.

8 Claims, 35 Drawing Sheets

| CONTACTS | 25a | 25b | 25c | 25d |
|---|---|---|---|---|
| B | ○——|——|——○ | ○ |
| A | | | ○——|——○ |
| N | | | | |
| C | | ○——|——○ | |
| D | ○——|——○——|——○ | |
| E | | ○——|——○——|——○ |
| F | ○——|——|——○ | |

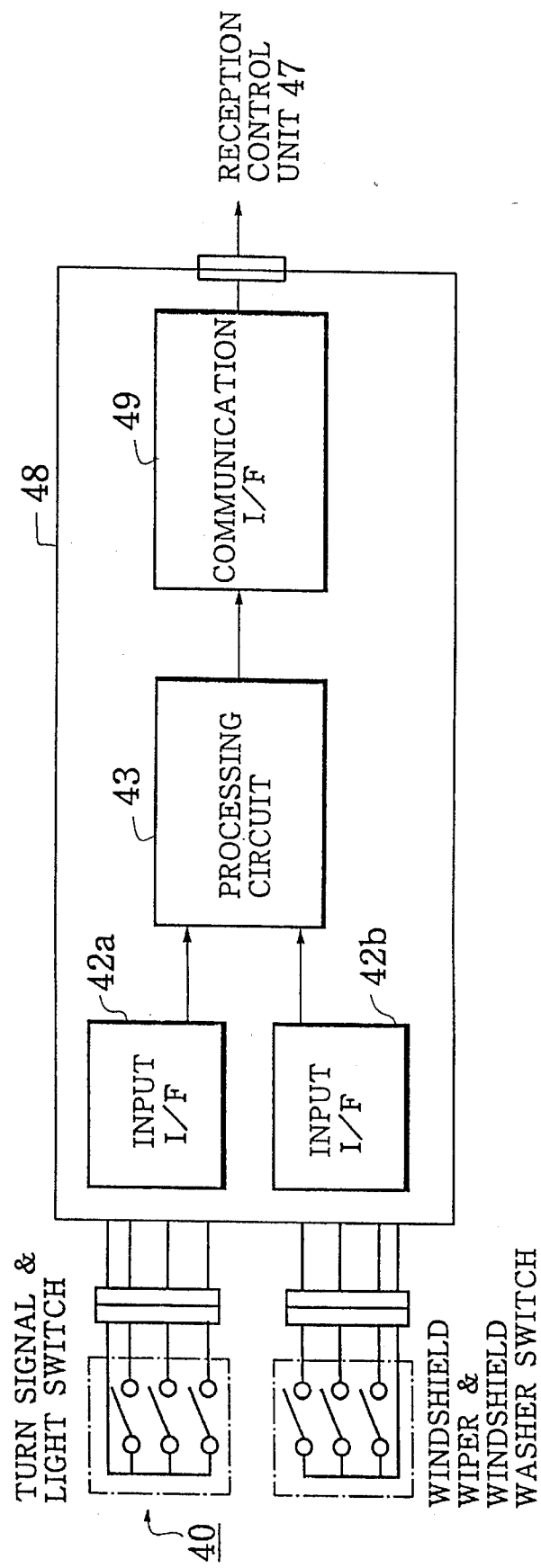

1 · · · SWITCH ON
0 · · · SWITCH OFF

|     |   | SENSOR 17a | SENSOR 17b | SENSOR 17c |
|-----|---|---|---|---|
| (L)  | B | 1 | 0 | 1 |
| (L') | A | 1 | 0 | 0 |
| (N)  | N | 0 | 0 | 0 |
| (R') | C | 0 | 1 | 0 |
| (R)  | D | 0 | 1 | 1 |
| (H1) | E | 1 | 1 | 0 |
| (H2) | F | 0 | 0 | 1 |

FIG. 34

1···SWITCH ON
0···SWITCH OFF

|         | SENSOR 17a | SENSOR 17b | SENSOR 17c |
|---------|------------|------------|------------|
| R       | 1          | 0          | 1          |
| R'      | 1          | 0          | 0          |
| OFF     | 0          | 0          | 0          |
| L'      | 0          | 1          | 0          |
| L       | 0          | 1          | 1          |
| HEAD(1) | 0          | 0          | 1          |
| HEAD(2) | 1          | 1          | 0          |

FIG. 41

1 · · · SWITCH ON
0 · · · SWITCH OFF

|  | SENSOR 17a | SENSOR 17b | SENSOR 17c |
|---|---|---|---|
| MIST | 1 | 0 | 0 |
| OFF | 0 | 0 | 0 |
| INT | 0 | 1 | 0 |
| LOW | 0 | 1 | 1 |
| HI | 1 | 0 | 1 |
| E WASHER | 1 | 1 | 0 |

स्‍5,457,443

MULTIFUNCTIONAL COMBINATION SWITCH

BACKGROUND OF THE INVENTION

This invention relates to a combination switch and, in particular, to a combination switch which allows considerable savings in cost and occupies less space on attachment, as well as improving durability of the switch itself.

A motor vehicle typically implements an electrical system containing a wide range of components such as switches and motors designed to perform a variety of tasks. Switches are used for making and breaking circuits for operating electrical equipment, including some frequently used devices, on a vehicle. For example, a turn signal lamp is operated almost every time when the vehicle is going to turn left or right. Headlamps are necessary for driving in darkness. Windshield wipers are also frequently operated on running. Most of these electric devices are operated by means of manually turning or shifting a switch lever provided near the steering wheel and connected to the combination switch.

A conventional combination switch mainly consists of a fixed substrate and a movable substrate. The fixed substrate is mounted on the bottom of a housing while the movable substrate is slidably attached to the housing with being opposed to the fixed substrate. The movable substrate travels to a predetermined position on the fixed substrate by means of turning of shifting a switch lever operatively connected to the housing. The movable substrate comprises a plurality of switch contacts and a common contact whereas the fixed substrate comprises a plurality of output contacts (output throws). The output contacts on the fixed substrate are equal in number to the desired functions to be performed such as turn signal lamp flashing and headlamp lighting. In other words, one output contact on the fixed substrate is for operating a driver or a motor to perform one of these functions. Thus, each electric device is operated only when the output contact assigned therefor is connected to the switch contact or the common contact.

As mentioned above, a conventional combination switch requires three contacts for three functions and six contacts for six functions. Such one-to-one basis assignment is wasteful of contacts only to increase the number of components for rather complex and large-scale switch structure. It has thus been desired to reduce a size of a combination switch and thereby saving cost and space for mounting it. In addition, the material used for the contacts is metal such as phosphor bronze which tends to cause contact failure due to contamination on the contact surface. Dust is also one of the possible causes of the contact failure.

SUMMARY OF THE INVENTION

An object of the present invention is to provide a small and simplified combination switch which occupies less space on being attached.

Another object of the present invention is to provide a combination switch which can be manufactured at low cost.

It is yet another object of the present invention to provide a combination switch of the improved durability.

In order to achieve the above mentioned objects, a first aspect of the present invention is to provide a combination switch for performing various functions comprising a first substrate having an output contact assembly, said output contact assembly including a common output contact and a plurality of output contacts electrically insulated from said common output contact; a second substrate arranged in parallel with said first substrate, said second substrate having a switch contact assembly, said switch contact assembly including a common contact and a plurality of contacts electrically connected to said common contact; operational means for moving said second substrate with respect to said first substrate to shift the position of said switch contact assembly relative to said output contact assembly, thereby selectively connecting said common output contact to said output contacts through said switch contact assembly to supply from said output contact assembly a pattern signal indicate of one of different conductive patterns; and a processor for judging, in response to said pattern signal, to which function the conductive pattern corresponds and producing an operational signal for performing the indicated function.

In the above mentioned structure, logic patterns defined by the desired functions and output contacts allow a combination switch to be manufactured with minimum output contacts. As a result, it becomes possible to reduce the number of components and provide a combination switch to be assembled in a smaller space. This contributes to save total costs for the combination switch.

A second aspect of the present invention is to provide a combination switch for performing various functions comprising a first substrate having a plurality of non-contact sensors; a second substrate arranged in parallel with said first substrate, said second substrate including a detected assembly to be detected by said non-contact sensor; operational means for moving said second substrate with respect to said first substrate to move the position of said detected assembly relative to said sensor, thereby selectively detecting said detected assembly with said sensors to supply therefrom a detection signal on detecting said detected assembly, said detection signal indicative of one of different output patterns; and a processor for judging, in response to said detection signal, to which function the output pattern corresponds and producing an operational signal for operating the performing the indicated function.

In the above mentioned structure, logic patterns defined by the desired functions and sensors allow a combination switch to be manufactured with minimum output contacts. As a result, it becomes possible to reduce the number of components and provide a combination switch to be assembled in a smaller space. This contributes to save total costs for the combination switch. Moreover, non-contact sensors render the combination switch more durable causing less contact failure and damage to improve reliability of the switch.

BRIEF DESCRIPTION OF THE DRAWINGS

FIG. 12 is a block diagram showing another example of a processor applied to the combination switch illustrated in FIG. 1;

FIG. 34 is a view for use in describing logic patterns obtained in accordance with the fourth embodiment of the present invention;

FIG. 41 is a view for use in describing logic patterns obtained in accordance with the fifth embodiment of the present invention;

DESCRIPTION OF THE PREFERRED EMBODIMENTS

The present invention will be described hereinafter with reference to the accompanying drawings.

First Embodiment

Figure 1:
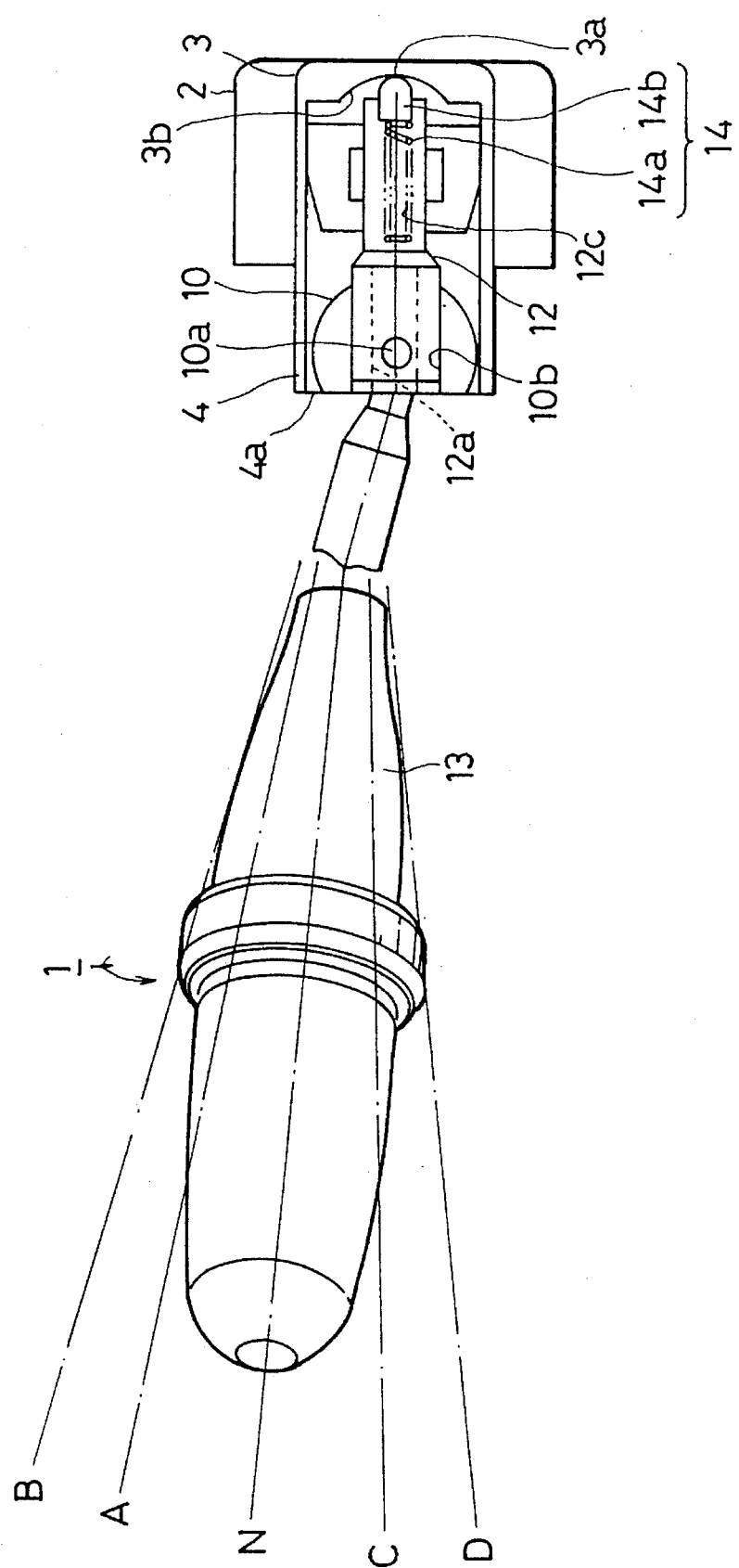
FIG. 1 is a plan view of a combination switch according to a first embodiment of the present invention.
Figure 2:
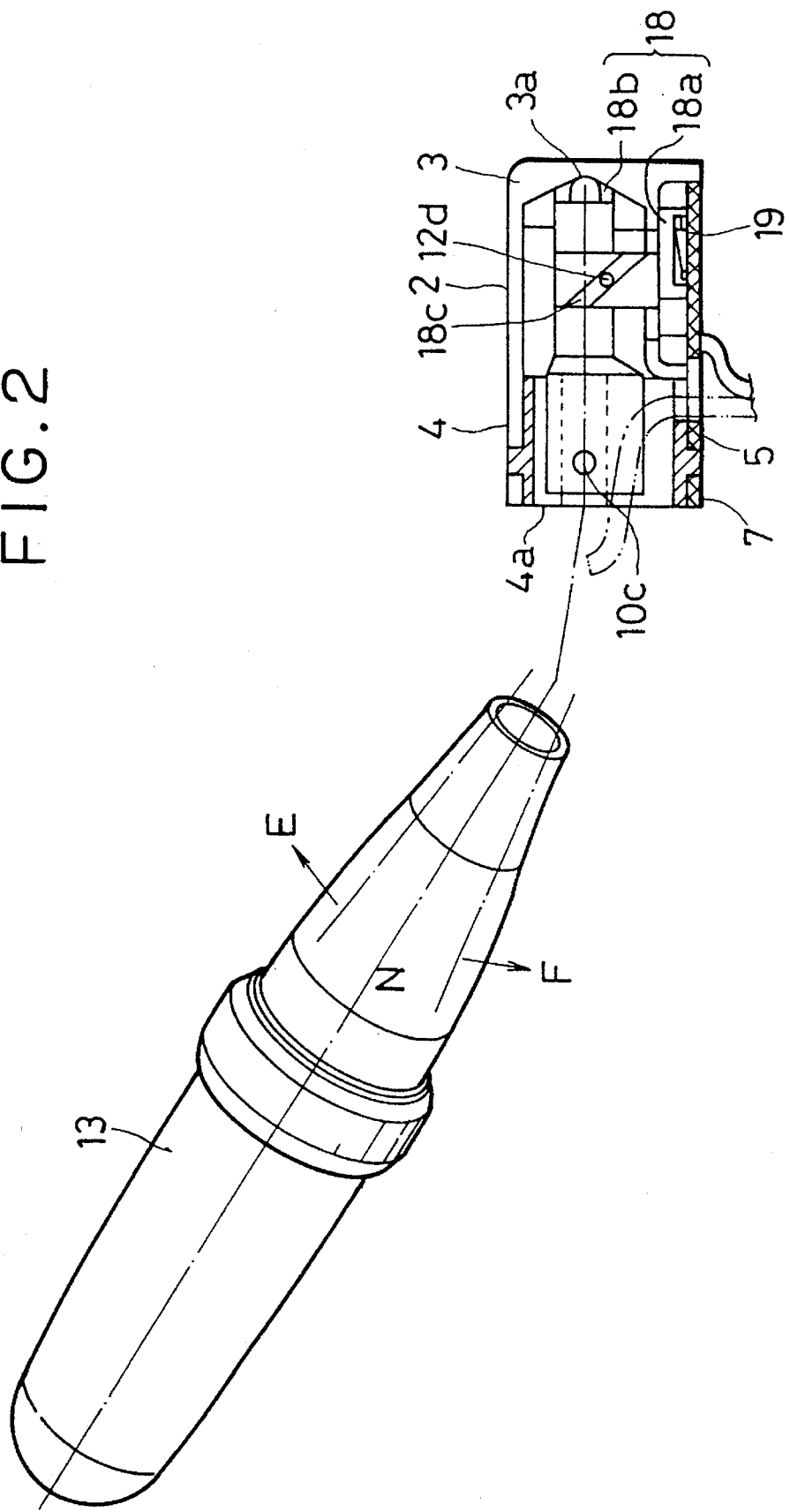
FIG. 2 is a front view of the combination switch illustrated in FIG. 1.

In the first exemplary embodiment, the combination switch according to the present invention is applied to a turn signal & light controlling switch of momentary type as shown in FIGS. 1 and 2. A switch body 1 comprises a housing 2 made of a hollow rectangular prism. The front end 3 of the housing 2 is closed while the rear end 4 thereof has an opening 4a. A bottom surface 5 also has an opening which, on the contrary, is closed by a fixed substrate 7 where a later described member is fitted. The inner surface of the front end 3 is in the form of a concavity with its central portion 3a being most depressed. The concavity serves as an abutting surface 3b opposite to a moderation arrangement which will be described below.

In the opening 4a, a joint member 10 is rotatably attached to the housing 2 through a pin 10a. The joint member 10 comprises a rectangular cavity 10b penetrating therethrough. A lever supporting member 12 having a rectangular cross-section is inserted into and engages with the rectangular cavity 10b along wall surfaces thereof. The lever supporting member 12 is rotatably supported by the joint member 10 through a pin 10c passing therethrough. A supporting hole 12a is opened on the rear end of the lever supporting member 12. The supporting hole 12a catches one end of a switch lever 13 which serves as operational member. The end of the switch lever 13 is thus inserted into the supporting hole 12a and secured thereto. The switch lever 13 can be moved freely with the pin 10a as a fulcrum in any one of the transversal directions A, B, N, C and D indicated in FIG. 1. The switch lever 13 can also be moved up and down, freely with the pin 10c as a fulcrum in any one of the directions E, N and F as depicted in FIG. 2. Each of the directions A through F is assigned to each function to be performed on the vehicle and the direction N corresponds to the neutral position.

The lever supporting member 12 has a front end where a mounting hole 12c is formed. An assembly 14 of compression spring 14a and an indenter 14b are inserted into the mounting hole 12c which act as the moderation arrangement. When the switch lever 13 is turned, the indenter 14b pressed against the abutting surface 3b is forced towards the central portion 3a. As mentioned above, the momentary technique is adopted to the turn signal & lamp controlling switch according to the first embodiment so that the switch lever 13 turned to either direction A through F is automatically returned to the neutral position N due to an arrangement (not shown) well known in the art. Driving pins 12d are projected from both sides of the lever supporting member 12.

A slider 18 is movably mounted on the fixed substrate 7 in an opposed manner. The slider 18 consists of a plate portion 18a facing to the fixed substrate 7 and a prong portion 18b standing from the plate portion 18a. The lever supporting member 12 is slidably held between each prong of the prong portion 18b. Inclined engage grooves 18c are formed on the inner surfaces of the prong portion 18b to engage the driving pins 12d. Engagement between the driving pins 12d and the inclined engage grooves 18c allows the slider 18 to move back and forth as the lever supporting member 12 (or the switch lever 13) is shifted upward or downward.

Figure 3:
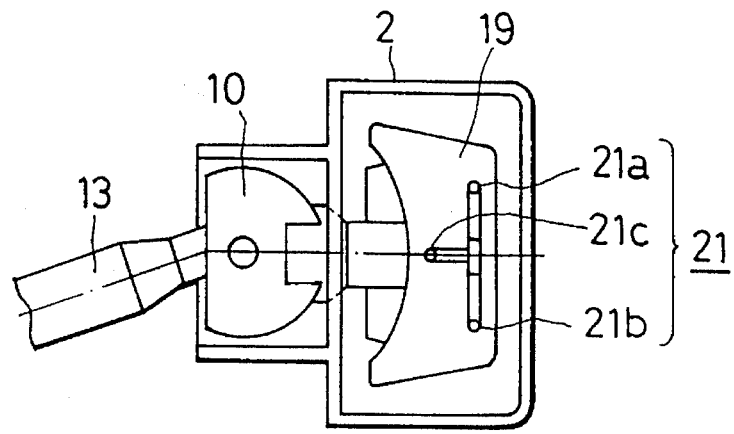
FIG. 3 is a bottom plan view of the combination switch illustrated in FIG. 1.

Referring to FIG. 3 in addition to FIGS. 1 and 2, a movable substrate 19 is attached to the lower surface of the slider 18. The movable substrate 19 comprises a switch contact assembly 21 disposed thereon. The switch contact assembly 21 consists of two contacts 21a and 21b and a common contact 21c, each of which is arranged at each vertex of a triangle. Each of the contacts 21a and 21b is connected to the common contact 21c. The movable substrate 19 travels back and forth, and right and left, with the slider 18 when the switch lever 13 is shifted or turned.

Figure 4:
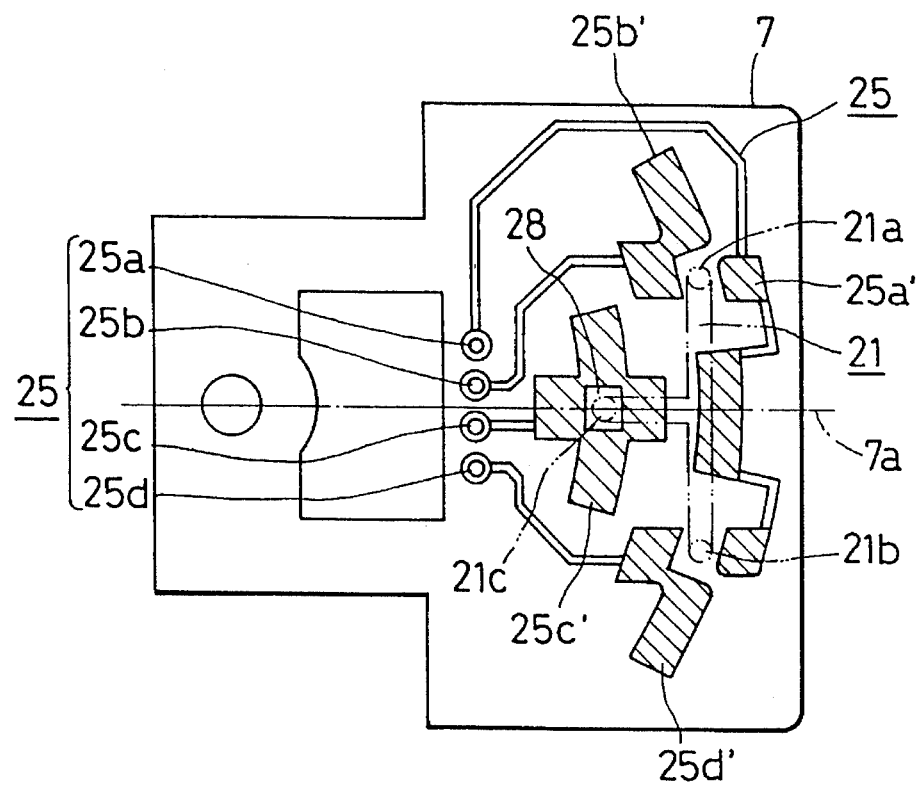
FIG. 4 is an expanded plan view of a main portion of the combination switch illustrated in FIG. 1.

Turning to FIG. 4, the fixed substrate 7 comprises an output contact assembly 25 disposed thereon. The output contact assembly 25 consists of three output contacts 25a, 25b and 25d and a common output contact 25c. The output contacts 25a, 25b and 25d are electrically connected to contact pieces 25a', 25b' and 25d', respectively. The common output contact 25c is electrically connected to a contact piece 25c'. Each of the output contacts 25a through 25d has a terminal (not shown) to supply an output signal to a processor 40. The common output contact 25c is electrically connected to no other output contacts through communication between the common output contact 25c and other output contact can be established in the manner exemplified below. When the common contact 21c of the switch contact assembly 21 contacts the common output contact 28c and, simultaneously, the contact 21a contacts the output contact 25a, the common output contact 25c is connected to the output contact 25a and thus an output is generated from the output contact 25a.

Figures 9, 10:
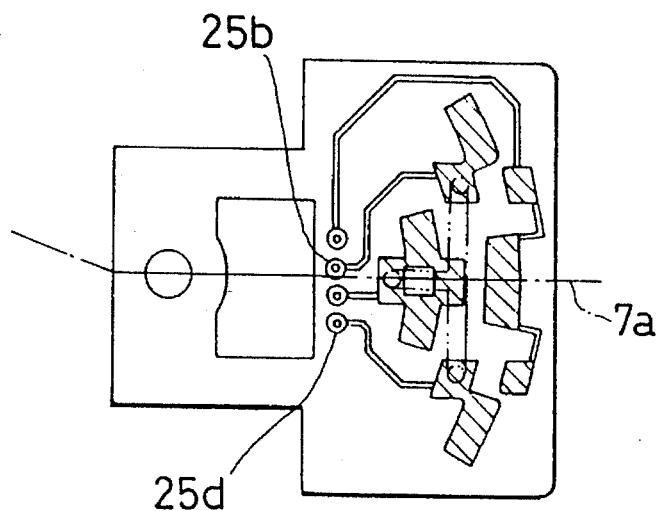
FIG. 9 is yet another view for use in describing relative position between a switch contact assembly and an opposed output contact assembly in the combination switch according to the first embodiment of the present invention.
FIG. 10 is a view for use in describing logic patterns obtained in accordance with the first embodiment of the present invention.

Relative positions between the fixed and the movable substrates 7 and 19 yield various combinations of contacts in 'conductive' state as shown in FIG. 10. FIG. 10 shows examples of logic patterns representing energized output contacts and the switching positions A through F and N, where a circle represents the energized output contact. For example, turning the switch lever 13 to the position B results in communication among output contacts 25a, 25c and 25d. The position C of the switch lever 13 makes the output contacts 25b and 25c conductive. As mentioned above, the position N represents the neutral so that no output contact is energized. The different logic patterns can thus be obtained for each of the positions A through F and N.

Figure 5:
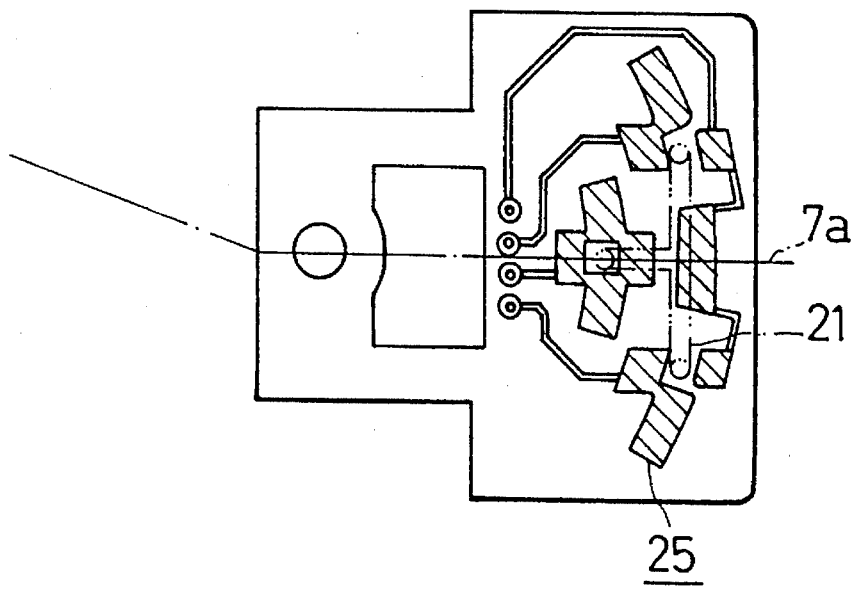
FIG. 5 is a view for use in describing relative position between a switch contact assembly and an opposed output contact assembly in the combination switch according to the first embodiment of the present invention.
Figure 6:
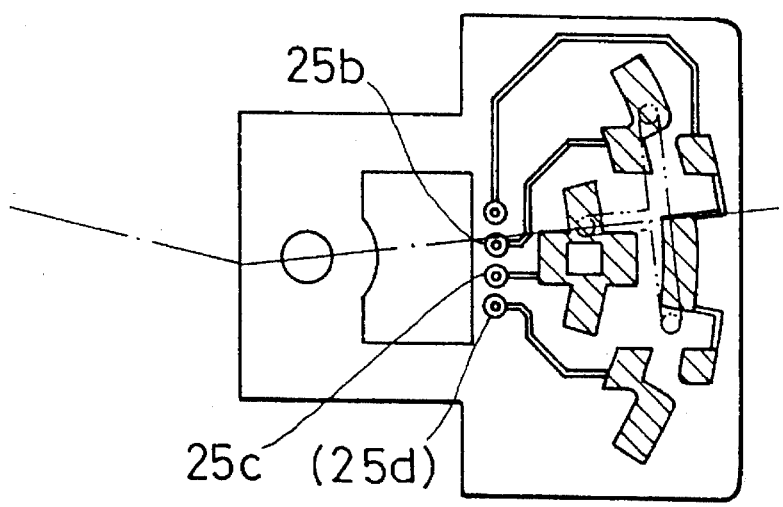
FIG. 6 is a view for use in describing relative position between a switch contact assembly and an opposed output contact assembly in the combination switch according to the first embodiment of the present invention.
Figure 7:
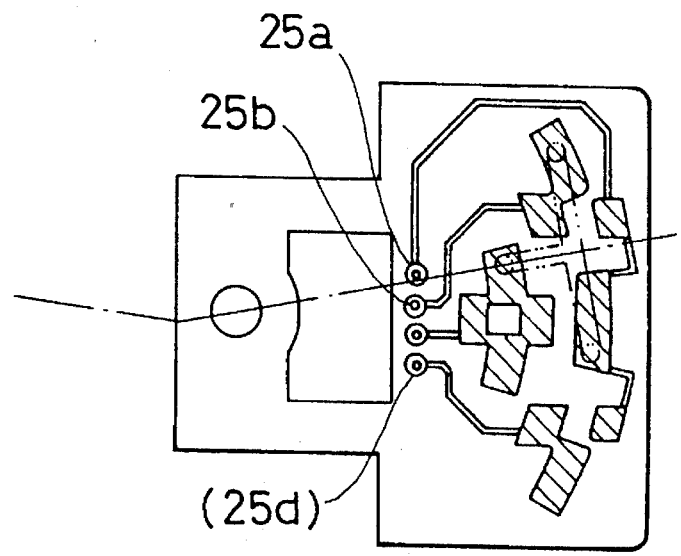
FIG. 7 is another view for use in describing relative position between a switch contact assembly and an opposed output contact assembly in the combination switch according to the first embodiment of the present invention.
Figure 8:
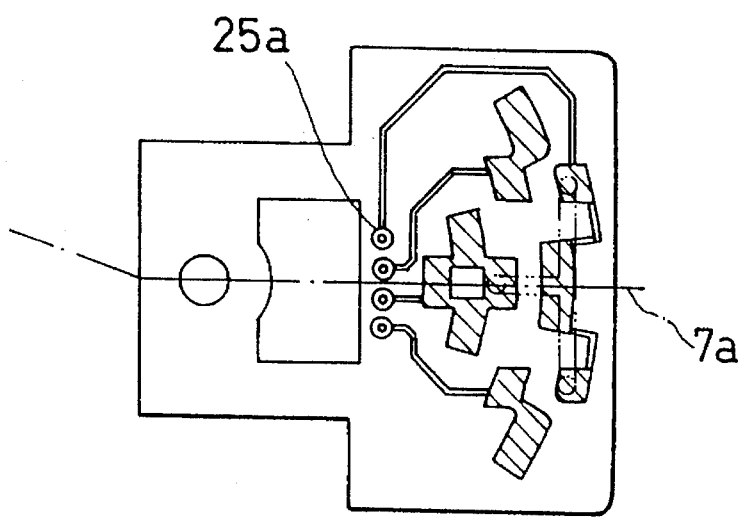
FIG. 8 is still another view for use in describing relative position between a switch contact assembly and an opposed output contact assembly in the combination switch according to the first embodiment of the present invention.

With reference to FIGS. 5 through 9, the relative position between the switch and the output contact assemblies 21 and 25 are shown in detail for each of the above mentioned positions. FIG. 5 indicates the contact relation therebetween when the switch lever 13 is at the position N. FIG. 6 indicates the contact relation when the switch lever 13 is at the position C. In this event, the output contact 25b is connected to the output contact 25c. Similarly FIG. 7 corresponds to the position D while FIG. 8 corresponds to the position F. FIG. 9 is for the position E to establish communication among the output contacts 25b, 25c and 25d. While the illustration is omitted for the positions A and D, it is readily understood that the positions A and C are symmetrical in contact relation with respect to a central axis 7a and that the positions B and D are symmetrical with respect to the central axis 7a.

Figure 11:
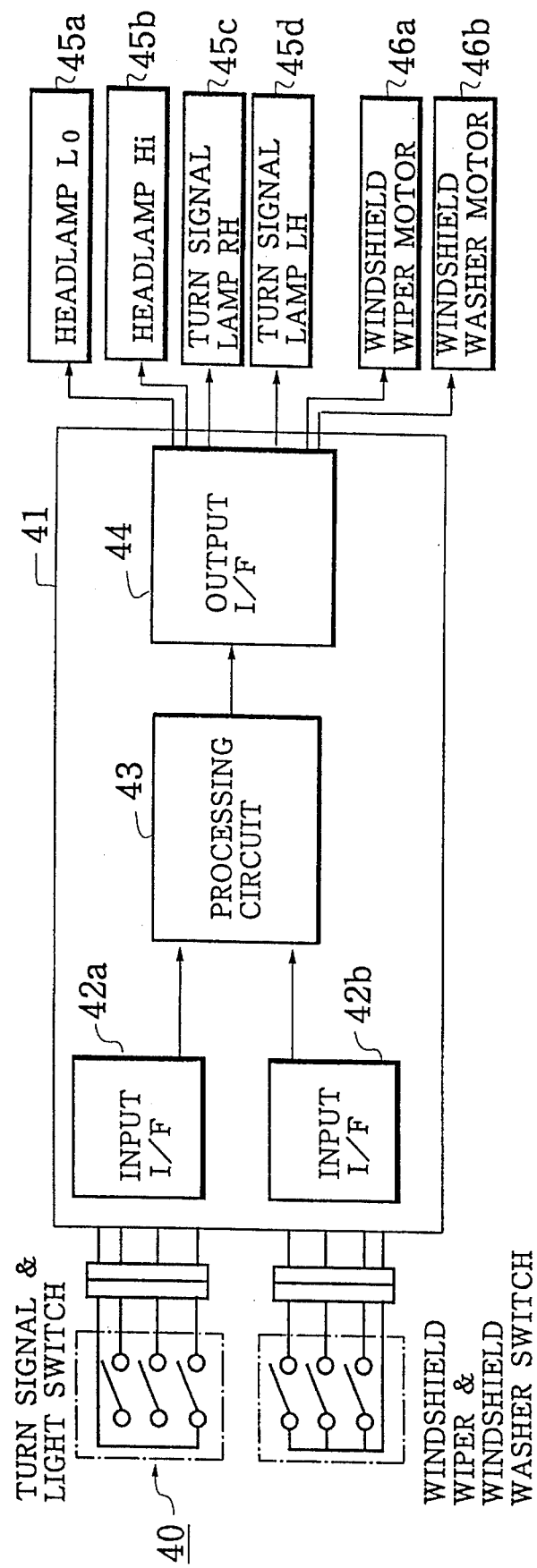
FIG. 11 is a block diagram of a processor applied to the combination switch illustrated in FIG. 1.

Turning to FIGS. 11 and 12, the processor 40 is now described. In FIG. 11, the processor 40 according to the present invention comprises an electronic control circuit 41. The electronic control circuit 41 consists of input interfaces (I/Fs) 42a and 42b, a processing circuit 43, and an output interface (I/F) 44. An output signal of each of the input I/Fs 42a and 42b is supplied to the processing circuit 43. The processing circuit 43 supplies an output signal to the output I/F 44. The input I/F 42a is connected to each of the output contacts 25a through 25d. The output contacts 25a through 25d are for either one of the turn signal & light controlling switch or a later-described windshield wiper & windshield washer switch. The input I/F 42b is also connected to each of the output contacts 25a through 25d for the other one of the two switches. Output or conductive patterns for the positions A through F and N are represented by truth values. For example, the switch position B results in conductivity of output contacts 25a, 25c and 25d as shown in FIG. 10. This conductive pattern for the position B can be represented by truth values of "1, 0, 1, 1". The conductive pattern for the neutral position N can be represented by those of "0, 0, 0, 0". In response to the conductive pattern supplied through either one of the input I/Fs 42a and 42b, the processing circuit 43 determines to which function the conductive pattern corresponds. The processing circuit 43 comprises a logic circuit which is not shown to carry out this processing. The processing circuit 43 produces an operating signal indicative of the determined function to the output I/F 44. The output I/F 44 is connected to the functions corresponding to the switch positions A through F. In response to the operating signal, the output I/F 44 activate a driving unit for the determined function such as a windshield wiper motor 46a or windshield washer motor 46b or a selected lamp 45a–d.

FIG. 12 shows another example of the processor 40. The processor 40 shown in FIG. 12 comprises an electronic control circuit 48 instead of the electronic control circuit 41 in FIG. 11. The electronic control circuit 48 also comprises the input I/Fs 42a and 42b and the processing circuit 43, which are similar in structure and operation to those shown in FIG. 11 so that description thereof will be omitted here. The output I/F 44 is substituted by a communication I/F 49 for multiplexing. The output of the processing circuit 43 is supplied to a reception controlling unit 47 through the communication I/F 49.

The present invention will further be described regarding its operation when applied to a turn signal & light controlling lever switch. In this event, the above mentioned positions A through F are for each function as follows: A is for momentarily flashing the left turn signal to change the driving lane to left; B is for flashing the left turn signal to turn to left; C is for momentarily flashing the right turn signal to change the driving lane to right; D is for flashing the right turn signal to turn to right; E is for changing the brightness of the headlamp and F is for momentarily energizing the headlamp.

The right turn signal flashes, when a vehicle is going to turn right, by means of shifting the switch lever 13 from the position N (neutral) to the position D. As a result of this shifting, the switch contact assembly 21 faces to the output contact assembly 25 in the contact relation shown in FIG. 7. More particularly, the common output contact 25c is connected to the output contacts 25a and 25b. These three output contacts are in an "ON" state while the output contact 25d is in an "OFF" state. This conductive pattern or the truth values "1, 1, 1, 0" is supplied to the processing circuit 43 through the input I/F 42a. The logic circuit in the processing circuit 43 determines that this conductive pattern corresponds to a shifting command of "flash the right turn signal". The processing circuit 43 produces an operating signal indicative of the determination result. The operating signal is supplied to the output I/F 44 to flash the right turn signal RH.

When applying the present invention to a windshield wiper control & windshield washer lever switch, the positions A through F are for operating windshield wipers. For example, the windshield wipers are operated as the switch lever 13 is shifted to the position A. B is for intermittent operation of the wipers. C and D are for high-speed and low-speed operation of the wipers. E is for the windshield washers and F is for the "mist-wipers" to reciprocate the wipers only one time. The operation is similar to that described in conjunction with the case of the turn signal & light controlling lever switch so that a detailed description will be omitted here.

Second Embodiment

Next, a second embodiment will be described where the present invention is also applied to a turn signal & light controlling switch of the momentary type.

Figure 13A:
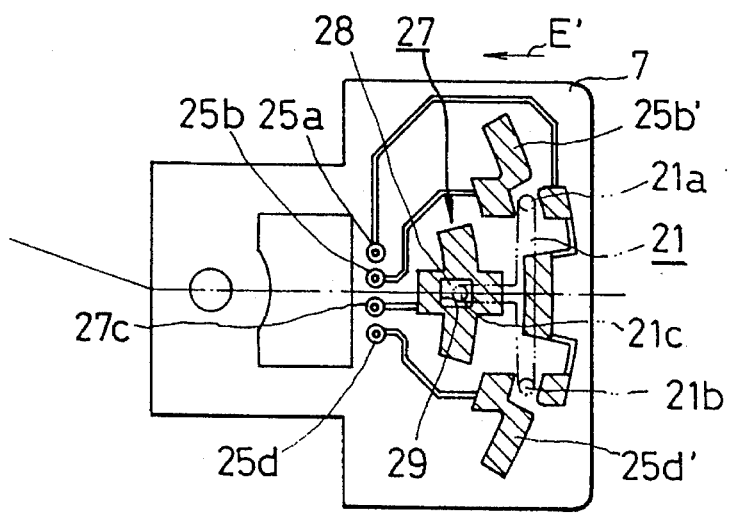
FIGS. 13A through 13C are views for use in describing relative position between a switch contact assembly and an output contact assembly in a combination switch according to a second embodiment of the present invention.
Figure 13B:
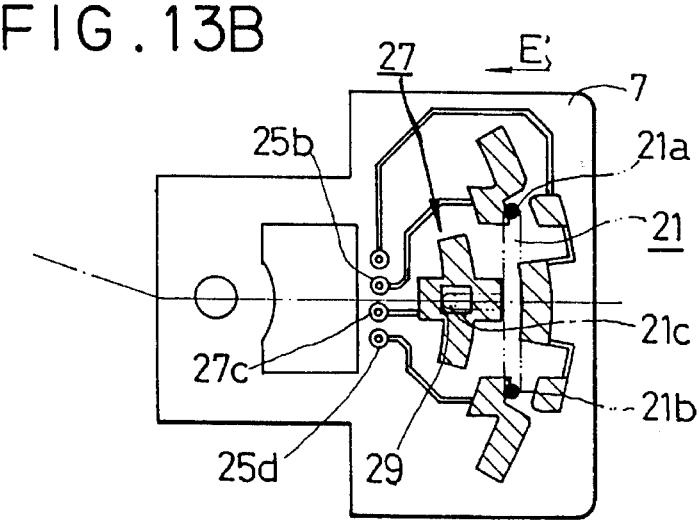
Figure 13C:
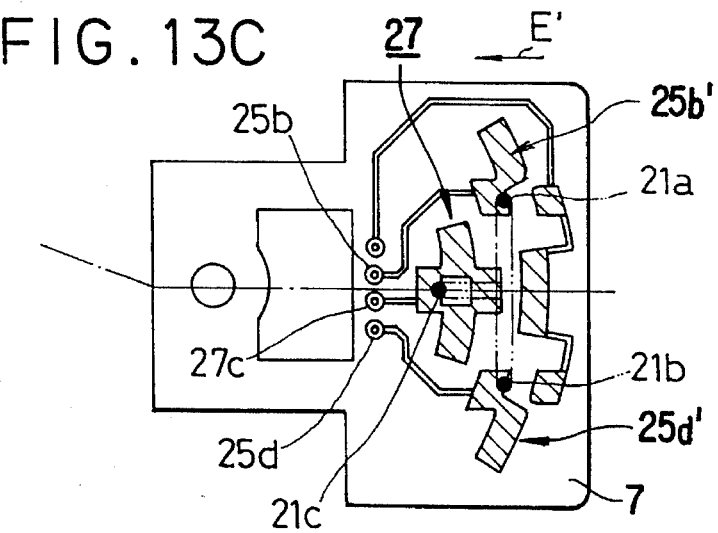
Figure 14:
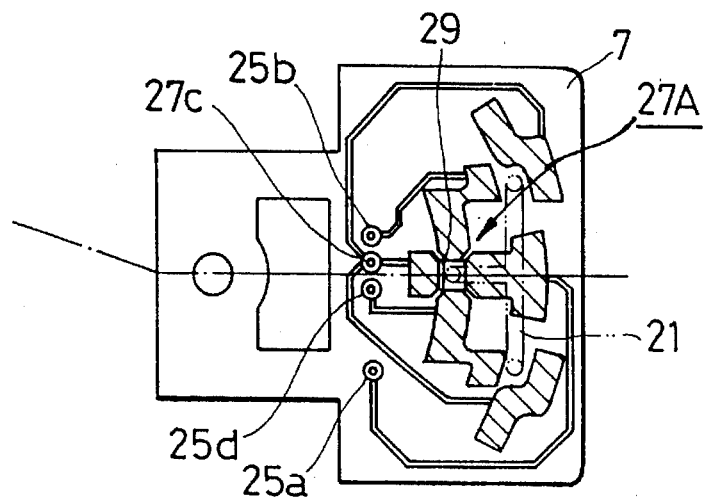
FIG. 14 is a plan view similar to FIGS. 13A through 13C showing another example of relative positions.
Figure 15:
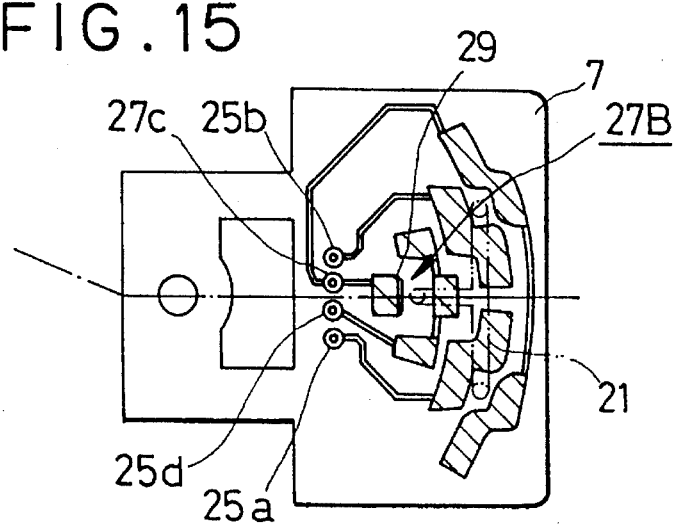
FIG. 15 is a plan view similar to FIGS. 13A through 13C showing another example of relative positions.
Figure 16:
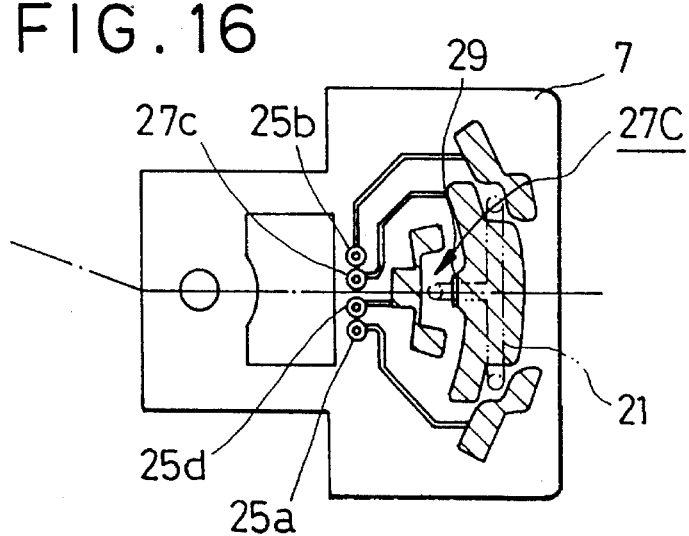
FIG. 16 is a plan view similar to FIGS. 13A through 13C showing another example of relative positions.
Figure 17:
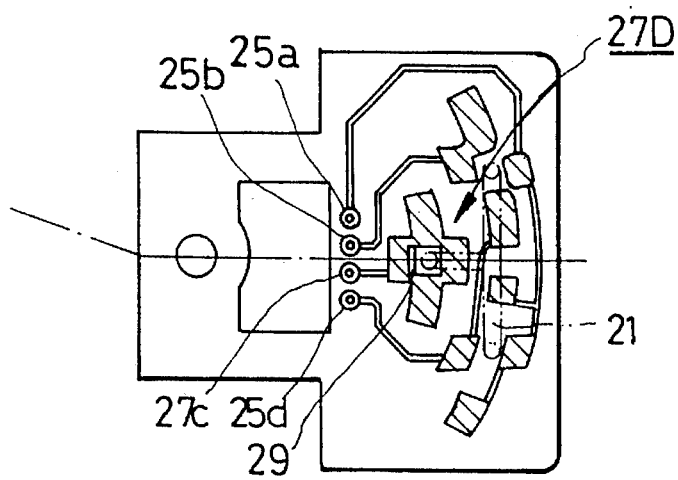
FIG. 17 is a plan view similar to FIGS. 13A through 13C showing another example of relative positions.
Figure 18:
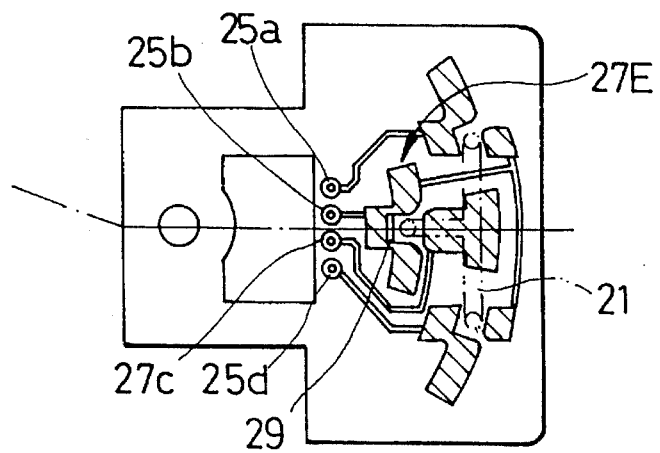
FIG. 18 is a plan view similar to FIGS. 13A through 13C showing another example of relative positions.
Figure 19:
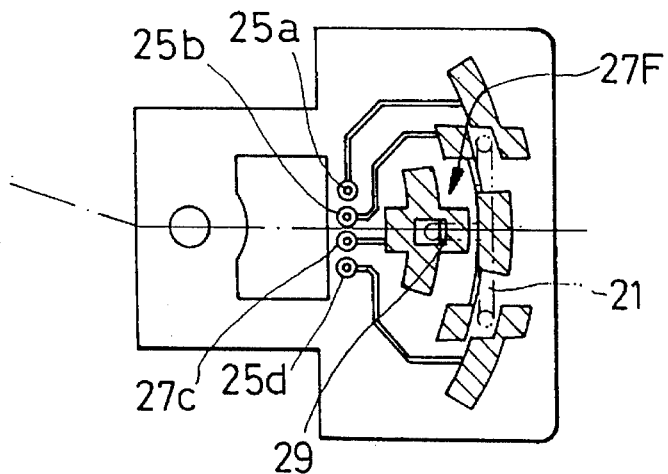
FIG. 19 is a plan view similar to FIGS. 13A through 13C showing another example of relative positions.
Figure 20:
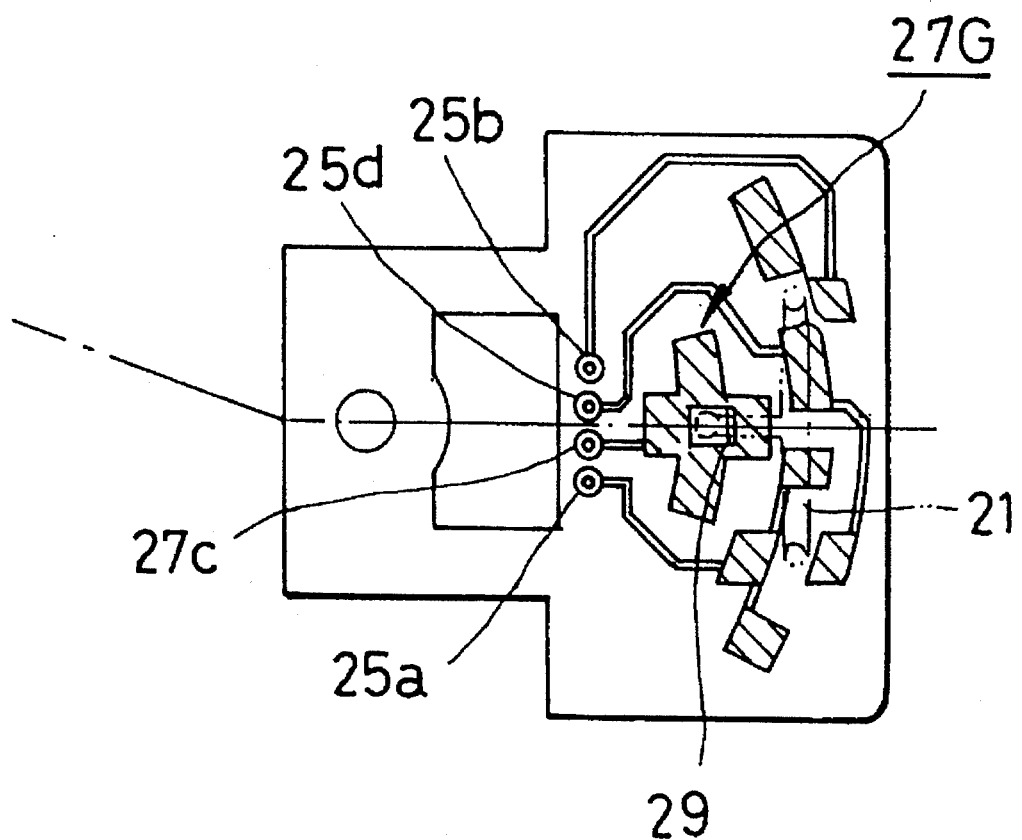
FIG. 20 is a plan view similar to FIGS. 13A through 13C showing another example of relative positions.

Referring to FIGS. 13A, 13B and 13C, the combination switch according to the second embodiment is similar in structure to that illustrated in FIG. 4 except for the output contact assembly 27. Similar parts and components are depicted by like reference numerals and description for such parts is omitted here.

FIG. 13A shows the combination switch in the neutral state. When the switch contact assembly 21' is moved in the direction E', the switch contact assembly 21' is shifted to the position as shown in FIG. 13C. In this event, the contact 21a contacts the contact piece 25b' of the output contact 25b and the contact 21b contacts the contact piece 25d' of the output contact 25d. Simultaneous occurrence of these contact operations is, however, relatively rare and one of these contacts 21a and 21b generally contacts its corresponding output contact earlier than the other. If the common contact 21c contacts the common output contact 25c and following which the contact 21a contacts the contact piece 25b' before the contact 21b contacts the contact piece 25d', only the output contact 25a is put into the conductive state. This means the faulty operation.

In order to prevent the above mentioned faulty operation problem, the present embodiment provides a common output contact 27 as shown in FIGS. 13A, 13B and 13C. The common output contact 27 is a modification of the common output contact 25c illustrated in FIG. 4. A neutral zone 28 formed on the common output contact 27 is larger than that illustrated in FIG. 4. The neutral zone 28 in this embodiment is further cutaway and enlarged at its backward position. As a result, the common contact 21c contacts the common output contact 27 after completion of contact at both switch contacts 21a and 21b. More particularly, a delay recess 29 is formed with the neutral zone 28 of the common output contact 27 to ensure delayed contacts between the common contact 21c and the common output contact 27. With this delay recess 29, it becomes possible to prevent faulty operations. The common output contact 27 may be in other shapes as shown in FIGS. 14 through 20. Though each of contacts 27A through 27G is different in shape in these figures, the basic operation thereof is similar to that described above. Accordingly description thereof will be omitted here.

While the above mentioned first and second embodiments have been described in conjunction with the particular embodiments of the present invention, it is understood that the output contact assembly may be made in various shapes and arrangement depending on requirements. In addition, the first and second embodiments are described regarding to the combination switch for a motor vehicle but not limited thereto.

Third Embodiment

Figure 21:
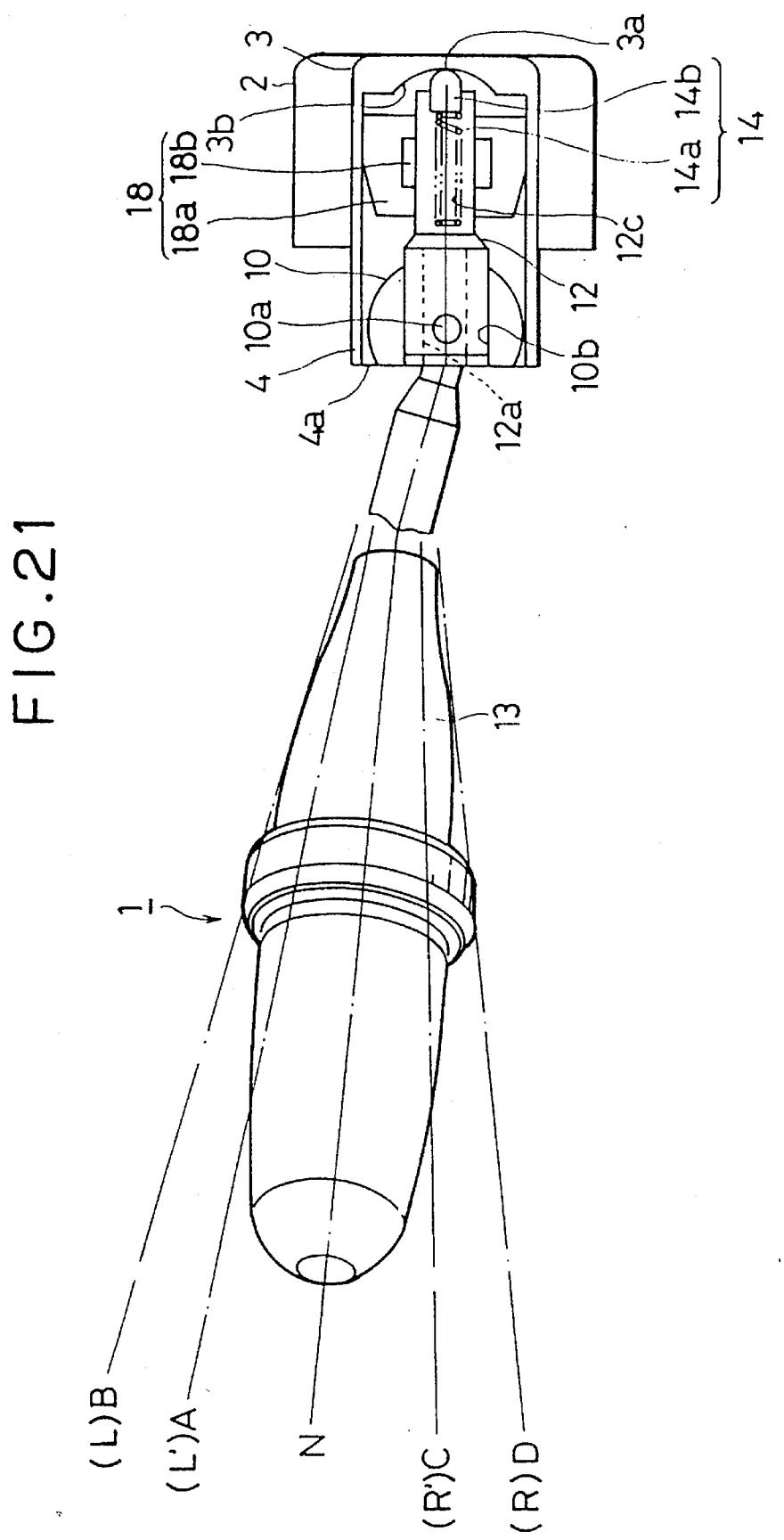
FIG. 21 is a plan view of a combination switch according to a third embodiment of the present invention.
Figure 22:
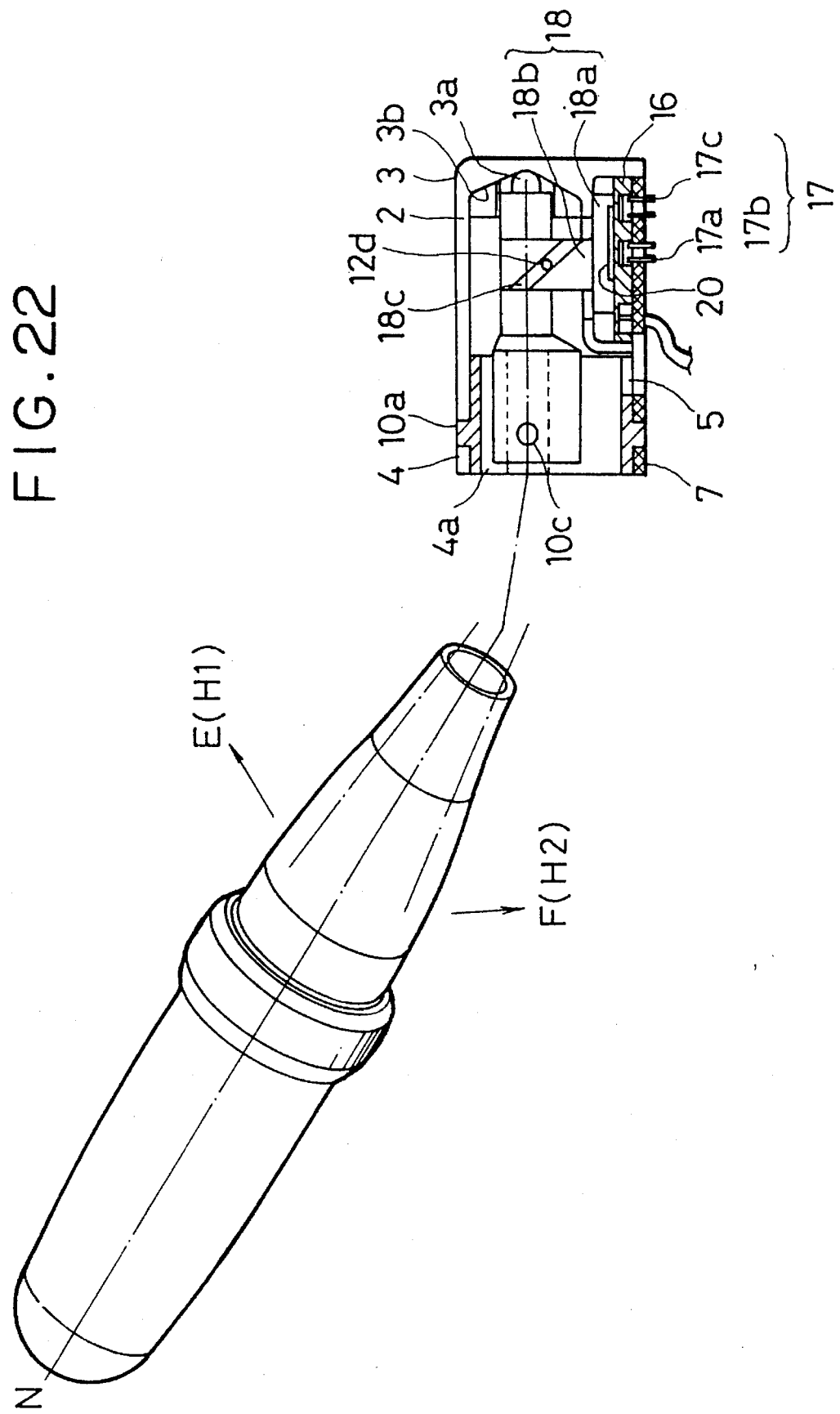
FIG. 22 is a front view of the combination switch illustrated in FIG. 21.

In the third embodiment, the combination switch according to the present invention is applied to a switch of momentary type for a motor vehicle as shown in FIGS. 21 and 22. A switch body 1 comprises a housing 2 made of a hollow rectangular prism. The front end 3 of the housing 2 is closed while the rear end 4 thereof has an opening 4a. A bottom surface 5 also has an opening which, on the contrary, is closed by a bottom plate 7 where a later described member is fitted. The inner surface of the front end 3 is in the form of a concavity with its central portion 3a being most depressed. The concavity serves as an abutting surface 3b opposite to a moderation arrangement which will be described below.

In the opening 4a, a joint member 10 is rotatably attached to the housing 2 through a pin 10a. The joint member 10 comprises a rectangular cavity 10b penetrating therethrough. A lever supporting member 12 having a rectangular cross-section is inserted into and engages with the rectangular cavity 10b along wall surfaces thereof. The lever supporting member 12 is rotatably supported by the joint member 10 through a pin 10c passing therethrough. A supporting hole 12a is opened on the rear end of the lever supporting member 12. The supporting hole 12a catches one end of a switch lever 13 which serves as operational member. The end of the switch lever 13 is thus inserted into the supporting hole 12a and secured thereto. The switch lever 13 can be moved freely with the pin 10a as a fulcrum in any one of the transversal directions A, B, N, C and D indicated in FIG. 21. The switch lever 13 can also be moved up and down, freely with the pin 10c as a fulcrum in any one of the directions E, N and F as depicted in FIG. 22. Each of the directions A through F is assigned for each function to be performed on the vehicle and the direction N corresponds to the neutral position.

The lever supporting member 12 has a front end where a mounting hole 12c is formed. An assembly 14 of compression spring 14a and an indenter 14b are inserted into the mounting hole 12c which act as the moderation arrangement. When the switch lever 13 is shifted, the indenter 14b pressed against the abutting surface 3b is forced towards the central portion 3a. As mentioned above, the momentary technique is also adopted to the switch according to the third embodiment so that the switch lever 13 turned to either direction A through F is automatically returned to the neutral position N due to an arrangement (not shown) well known in the art Driving pins 12d are projected from both sides of the lever supporting member 12.

A fixed substrate 16 is attached to the bottom plate 7 on which a sensor assembly 17 is disposed. The sensor assembly consists of three sensors 17a, 17b and 17c, each of which is arranged at each vertex of a triangle. Each of these sensors 17a, 17b and 17c is non-contact sensor and comprising a light emitting unit and photo detecting unit both of which are not shown in FIGS. 21 and 22. When the sensor assembly 17 faces to a detected member such as a metal, the light emitting unit emits the light to the detected member. The detected member reflects the light back to the photo detecting unit. The photo detecting unit generates an electric signal as a detection signal in response to the reflected light. Detailed structure and operation of the sensor assembly will be described below with reference to FIG. 31.

A movable substrate consisting of a slider 18 is movably mounted on the fixed substrate 16 in an opposed manner. The slider 18 consists of a plate portion 18a facing to the fixed substrate 16 and a prong portion 18b standing from the plate portion 18a. The lever supporting member 12 is slidably held between each prong of the prong portion 18b. Inclined engage grooves 18c are formed on the inner surfaces of the prong portion 18b to engage the driving pins 12d. Engagement between the driving pins 12d and the inclined engage grooves 18c allows the slider 18 to move back and forth as the lever supporting member 12 (or the switch lever 13) is shifted upward or downward.

Figures 27, 28:
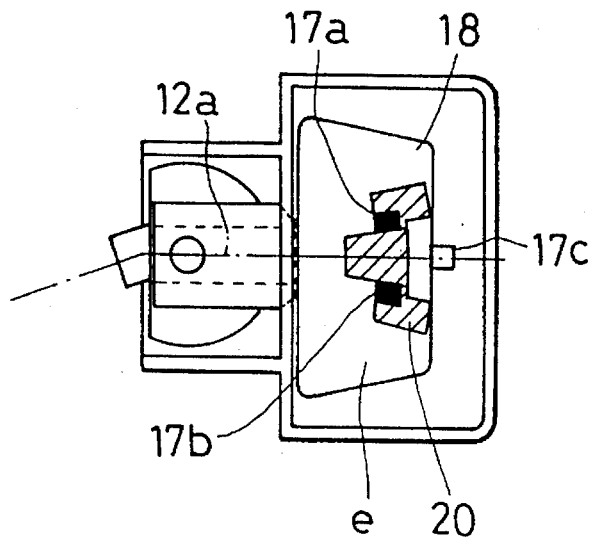
FIG. 27 is a view for use in describing relative position between a sensor assembly and an output pattern generating assembly in accordance with the third embodiment of the present invention.
FIG. 28 is a view for use in describing logic patterns obtained in accordance with the third embodiment of the present invention.

An output pattern generating assembly 20 is attached to the lower surface of the movable substrate 18. The output pattern generating assembly 20 is the above mentioned detected member made of a metal plate shaped in a predetermined form and having a high index of reflection. As described above, shifting the output pattern generating assembly 20 to change the relative position to the sensor assembly 17 provides various output patterns indicating presence or absence of the outputs of the sensors 17a, 17b and 17c. The output patterns are represented by truth values as shown in FIG. 28 showing logical combinations of the switch positions A through F and N and the outputs of the sensors. In this event, a logic "1" represents presence of the sensor output (the ON state) while "0" represents absence thereof (the OFF state).

Figure 23:
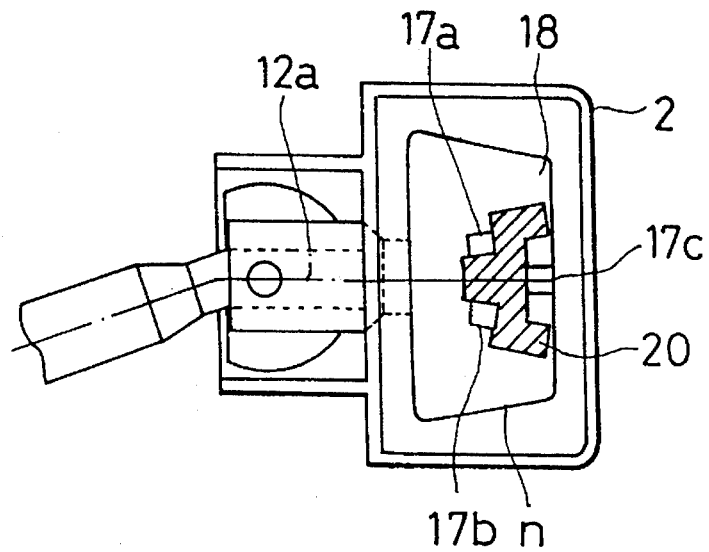
FIG. 23 is a view for use in describing relative position between a sensor assembly and an output pattern generating assembly in accordance with the third embodiment of the present invention.
Figure 24:
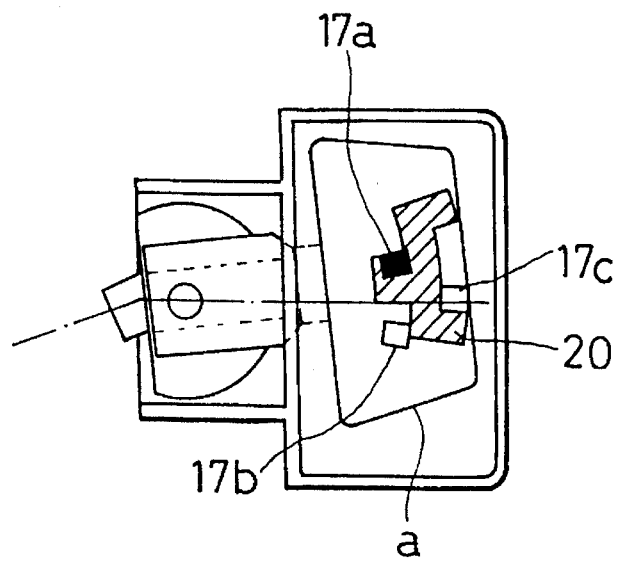
FIG. 24 is a view for use in describing relative position between a sensor assembly and an output pattern generating assembly in accordance with the third embodiment of the present invention.
Figure 25:
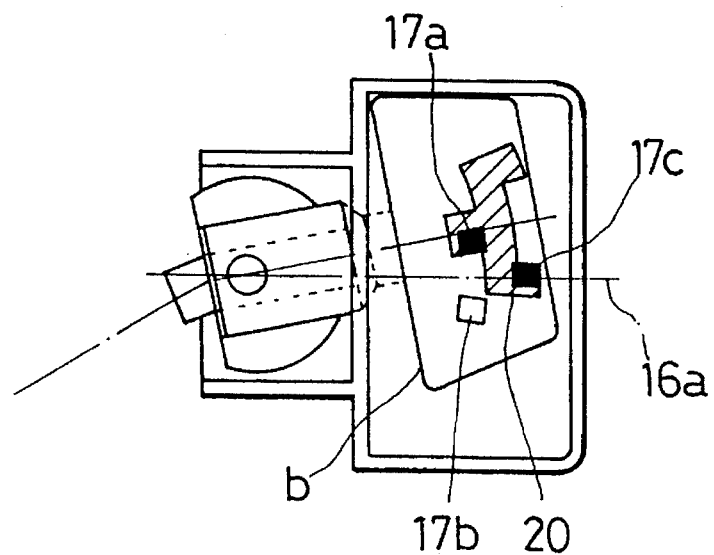
FIG. 25 is a view for use in describing relative position between a sensor assembly and an output pattern generating assembly in accordance with the third embodiment of the present invention.
Figure 26:
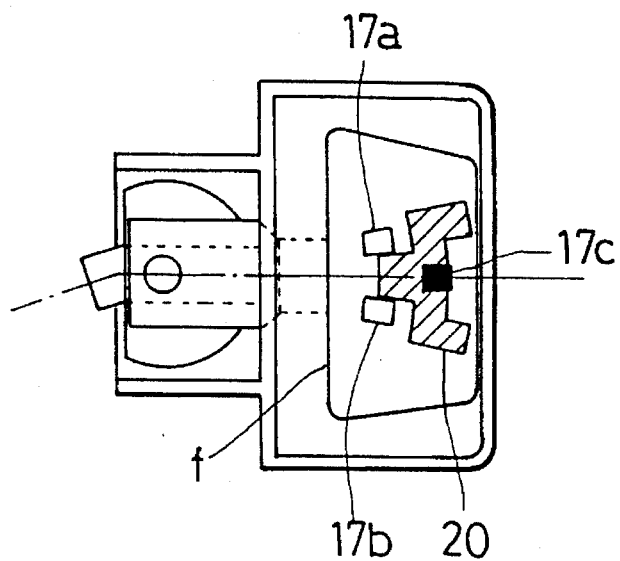
FIG. 26 is a view for use in describing relative position between a sensor assembly and an output pattern generating assembly in accordance with the third embodiment of the present invention.

The output pattern generating assembly 20 can be made in any preferable shape as long as the output patterns shown in the logical table in FIG. 28 can be obtained. Examples of shapes and arrangement of the output pattern generating assembly 20 are shown in FIGS. 23 through 27. In these figures, the sensors 17a, 17b and 17c are represented in either black or while. The black one corresponds to the above mentioned presence state or the ON state. On the other hand, the while one corresponds to the absence state or the OFF state. FIG. 23 shows a relative position for the switch position N (0, 0, 0) whereas FIG. 24 shows that for the switch position A (1, 0, 0). FIGS. 25 and 26 show those for the switch positions B (1, 0, 1) and F (0, 0, 1), respectively. FIG. 27 shows the relative position for the switch position E (1, 1, 0). While the illustration is omitted for the positions C and D, it is readily understood that the positions A and C are symmetrical in relation with respect to a central axis 16a and that the positions B and D are symmetrical with respect to the central axis 16a. The output patterns for the positions C and D are (0, 1, 0) and (0, 1, 1), respectively.

Figure 29:
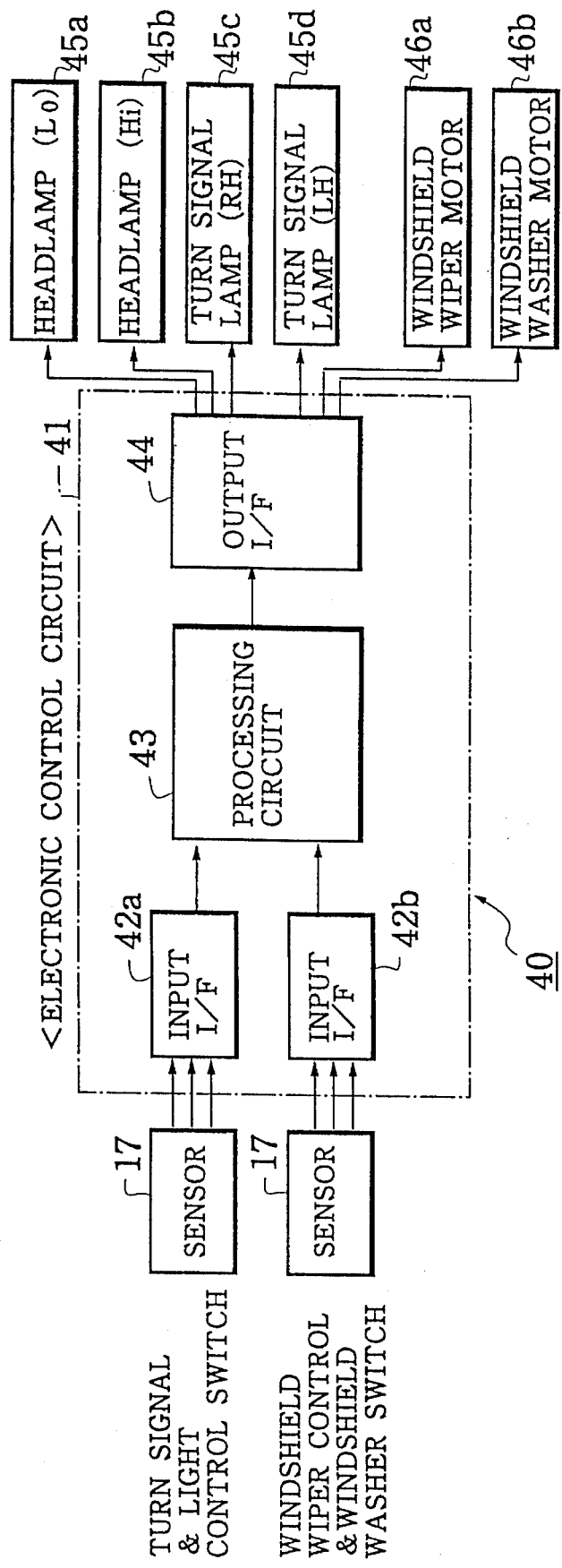
FIG. 29 is a block diagram of a processor applied to the combination switch illustrated in FIG. 21.

The outputs of the sensors 17a, 17b and 17c are supplied to a processor 40 as shown in FIG. 29. The processor 40 comprises an electronic control circuit 41. The electronic control circuit 41 consists of input interfaces (I/Fs) 42a and 42b, a processing circuit 43, and an output interface (I/F) 44. An output signal of each of the input I/Fs 42a and 42b is supplied to the processing circuit 43. The processing circuit 43 supplies an output signal to the output I/F 44. The input I/F 42a is connected to each of the sensors 17a through 17c. The sensors 17a through 17c are for either one of the turn signal & light controlling switch or a later-described windshield wiper & windshield washer switch. The input I/F 42b is also connected to each of the sensors 17a through 17c for the other one of the two switches. Output or conductive patterns for the positions A through F and N are represented by truth values in the similar manner as described in the processor 40 shown in FIG. 11. In response to the output pattern supplied through either one of the input I/Fs 42a and 42b, the processing circuit 43 determines to which function the output pattern corresponds. The processing circuit 43 comprises a logic circuit which is not shown to carry out this processing. The processing circuit 43 produces an operating signal indicative of the determined function to the output I/F 44. The output I/F 44 is connected to the functions corresponding to the switch positions A through F. In response to the operating signal, the output I/F 44 activate a driving unit for one of the functions such as the lamps 45a through 45d or windshield wiper motor 46a or windshield washer motor 46b.

Figure 30:
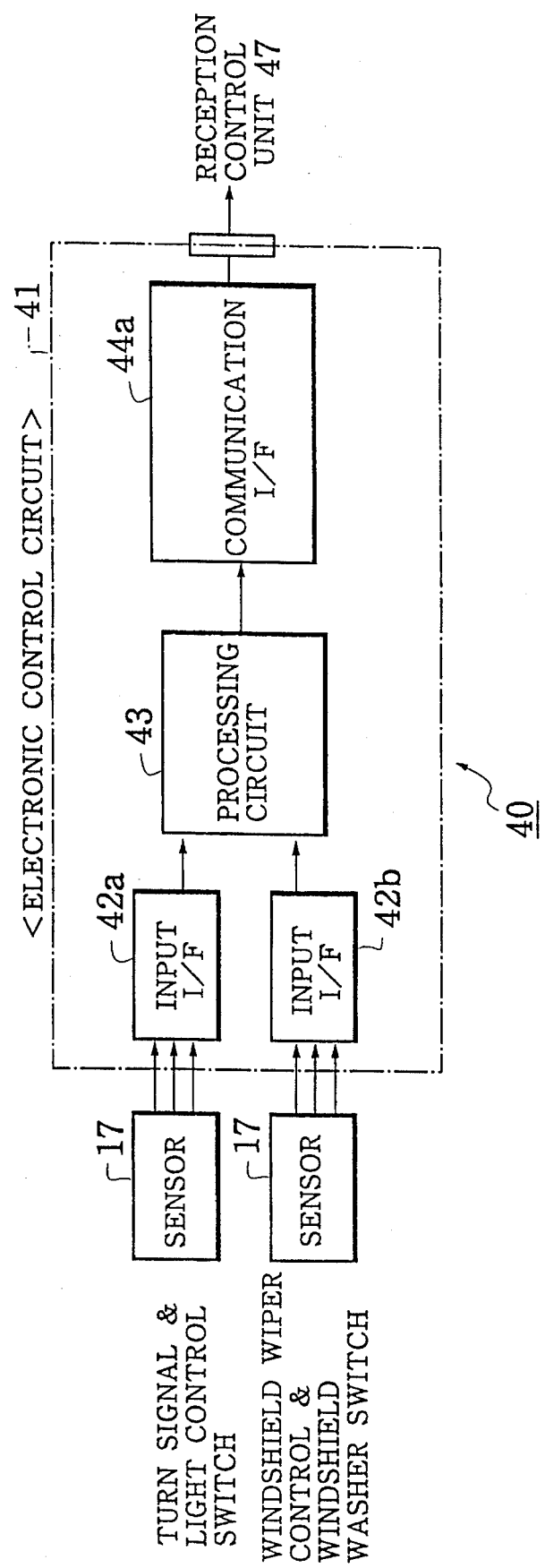
FIG. 30 is a block diagram of another example of a processor applied to the combination switch illustrated in FIG. 21.

FIG. 30 shows another example of the processor 40. The electronic control circuit 41 also comprises the input I/Fs 42a and 42b and the processing circuit 43, which are similar in structure and operation to those shown in FIG. 29 so that description thereof will be omitted here. The output I/F 44 is substituted by a communication I/F 44a for multiplexing. The output of the processing circuit 43 is supplied to a reception controlling unit 47 through the communication I/F 44a.

Figure 31:
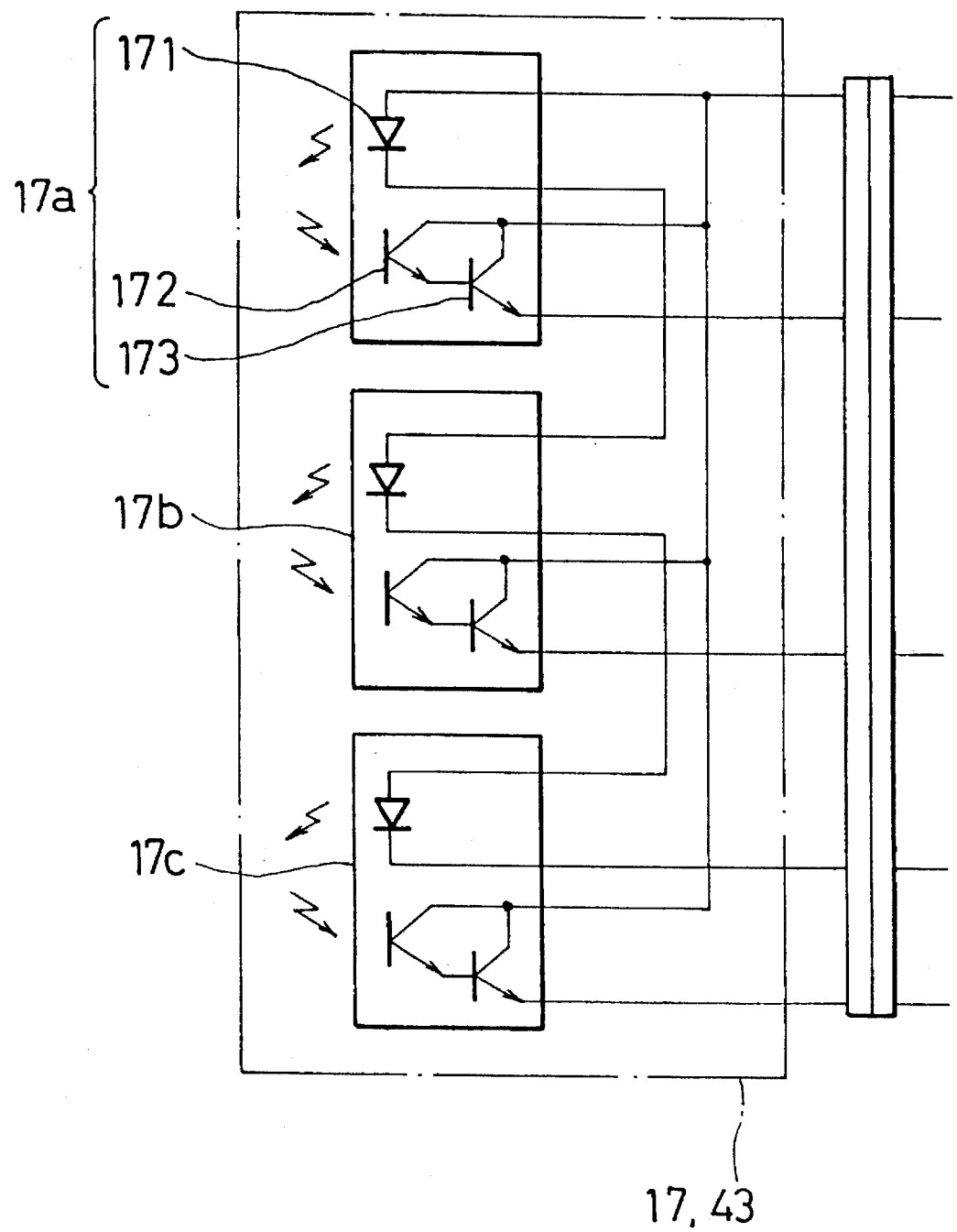
FIG. 31 is a circuit diagram showing a sensor assembly applied to the third embodiment of the present invention.

FIG. 31 is a circuit diagram showing the sensor assembly 17 applied to the third embodiment. The sensors 17a, 17b and 17c are similar in structure and in operation so that description will be made only for the sensor 17a. The sensor 17a comprises a light emitting unit 171, a photo detecting unit 172 and a transistor 173. The light emitting unit 171 may be a light emitting diode (LED) or other equivalents which enable emission of light. The light emitted from the light emitting unit 171 reflects on the surface of the output pattern generating assembly 20 if it extends to the light passage. The reflected light is directed to the photo detecting unit 172. In the illustrative embodiment, the photo detecting unit 172 is a photo transistor of NPN type which is sensitive to light. When the photo detecting unit 172 detects light, it is in a conductive state and current flows therethrough. Immediately the photo detecting unit 172 conducts, voltage is applied to the base of the transistor 173 to switch it 'on'. With the transistor 173 in a conductive state, a detection signal indicative of an output pattern is produced.

The third embodiment will further be described regarding to its operation when applied to a turn signal & light controlling lever switch. In this event, the above mentioned positions A through F are for each function: A (=L') is for momentarily flashing the left turn signal to change the driving lane to left; B (=L) is for flashing the left turn signal Lh to turn to left; C (=R') is for momentarily flashing the right turn signal to change the driving lane to right; D (=R) is for flashing the right turn signal Rh to turn to right; E (=H1) is for changing the brightness of the headlamp; and F (=H2) is for momentarily energizing the headlamp.

In order to flash the left turn signal Lh, the switch lever 13 is shifted from the position N (neutral) to the position B (L). The switch lever 13 automatically returns to the neutral position though the movable substrate 18 moves to face the sensor assembly 17 to the output pattern generating assembly 20 in the facing relation shown in FIG. 25. The sensors 17a and 17c produce the output while the sensor 17b produces no output. As a result, the output pattern "1, 0, 1" is supplied to the processing circuit 43 through the input I/F 42a. The logic circuit in the processing circuit 43 determines that this output pattern corresponds to "flash the left turn signal Lh". The processing circuit 43 produces an operating signal indicative of the determination result. The operating signal is supplied to the output I/F 44 to flash the left turn signal Lh.

When applying the present invention to a windshield wiper control & windshield washer lever switch, the positions A through F are for operating windshield wipers. For example, the windshield wipers are operated as the switch lever 13 is shifted to the position A. B is for intermittent operation of the wipers. C and D are for high-speed and low-speed operation of the wipers. E is for the windshield washers and F is for the "mist-wipers" to reciprocate the wipers only one time. The operation is similar to that described in conjunction with the case of the turn signal & light controlling lever switch so that a detailed description will be omitted here.

Fourth Embodiment

Figure 32:
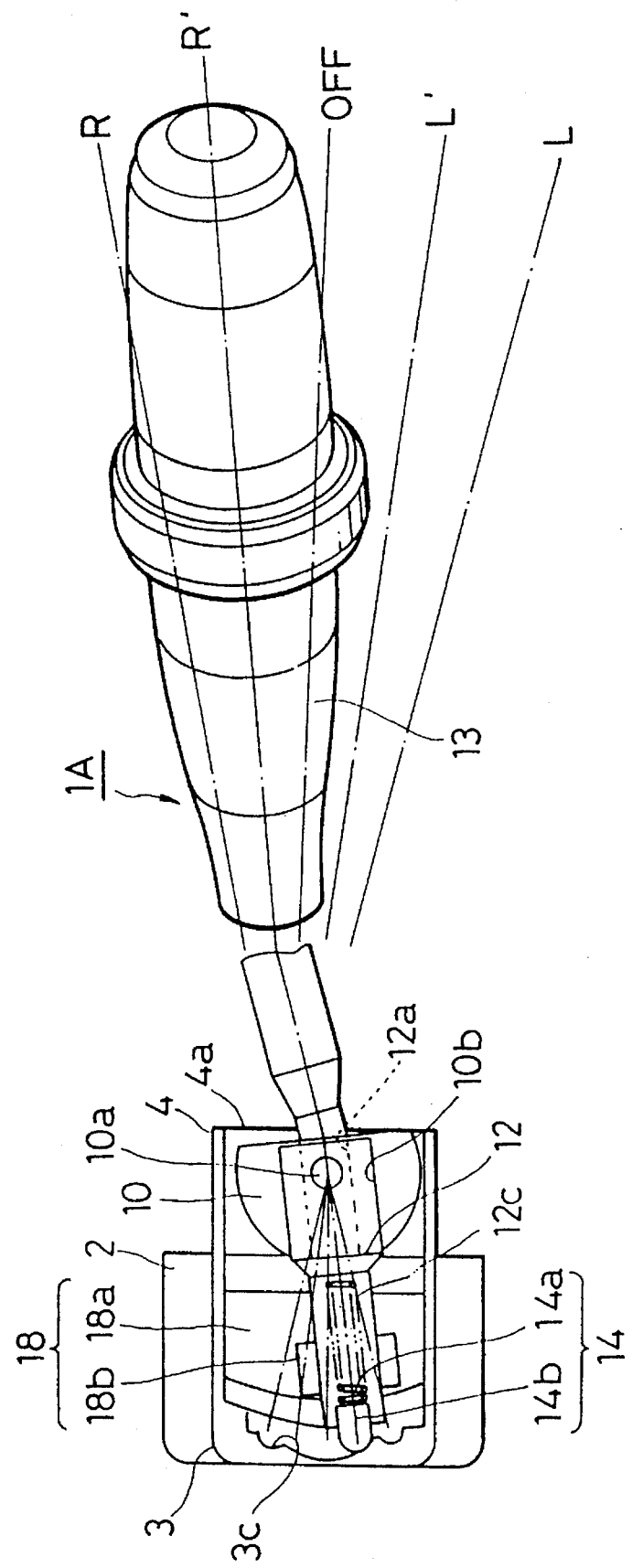
FIG. 32 is a plan view of a combination switch according to a fourth embodiment of the present invention.
Figure 33:
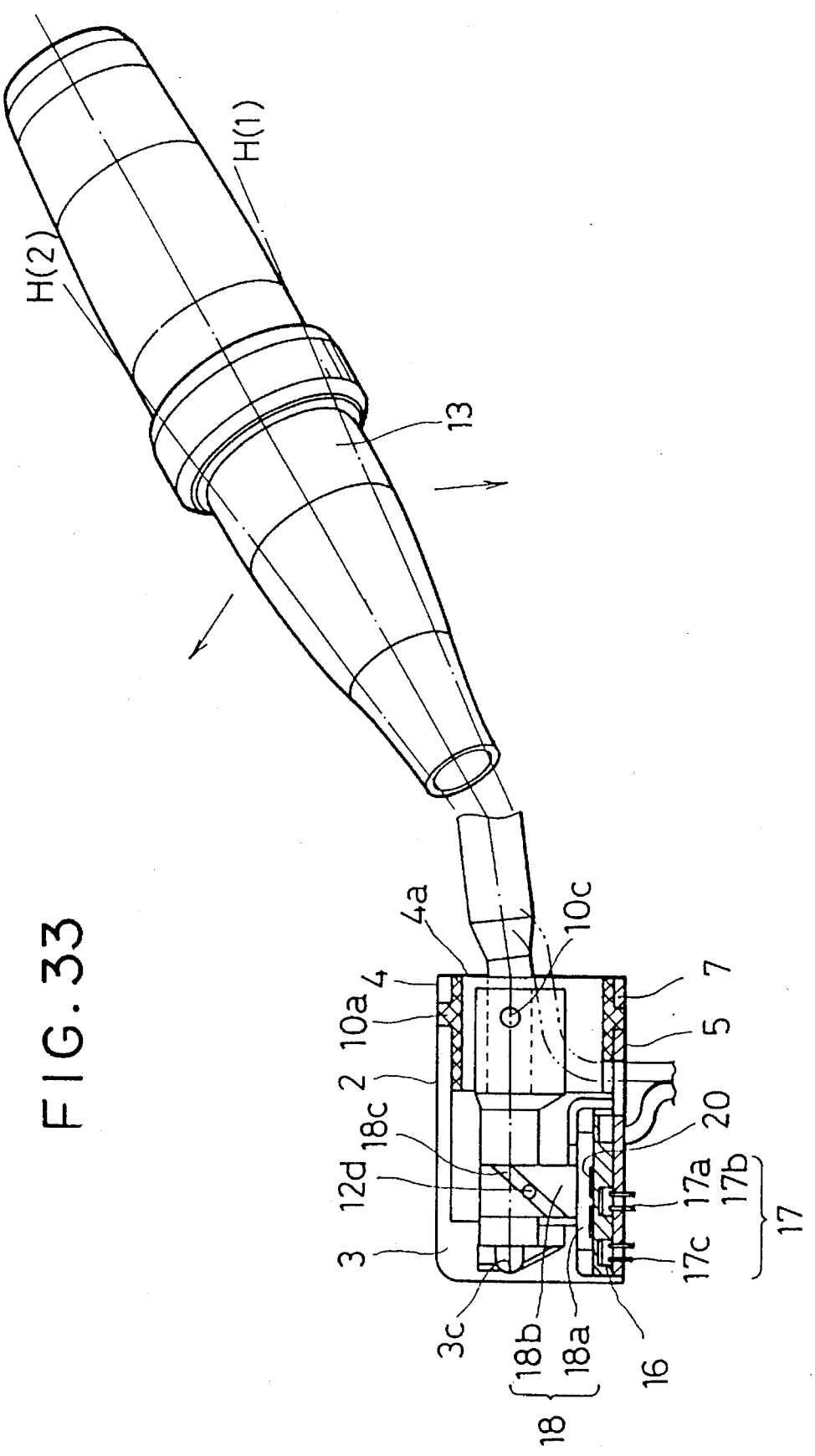
FIG. 33 is a front view of the combination switch illustrated in FIG. 32.

A fourth embodiment of the present invention will be described below. In this embodiment, the combination switch according to the present invention is applied to a turn signal & light controlling switch of constant type for a motor vehicle as shown in FIGS. 32 and 33. The turn cancellation mechanism is a conventional mechanical mechanism. This combination switch is adapted to seven different functions with three sensors. The number of relative positions given by these three sensors is eleven. The number of relative positions is larger than that of the functions to improve operability.

This embodiment concerns with a switch body 1A and a processor 40A. The processor 40A comprises similar parts to those illustrated in FIGS. 29 through 31. The operation of those parts is also similar to that described above so that the detailed description for the processor 40A is omitted here. In addition, the switch body 1A comprises similar parts designated by like reference numerals as in FIGS. 1 and 2. Description of such parts is also omitted here.

The switch body 1A according to the fourth embodiment comprises an abutting surface 3c rather than the abutting surface 3b in FIG. 1 in order to comply with the requirement for the constant type switch. The abutting surface 3c is larger in radius than the abutting surface 3b. The switch positions are represented by OFF, R', R, L', L, H(1) and H(2) instead of the positions N and A through F. These positions correspond to the functions: R' is for momentarily flashing the right turn signal to indicate an intent to move the vehicle to a right-side driving lane; R is for flashing the right turn signal to turn to right; L' is for momentarily flashing the left turn signal to indicate an intent to move the vehicle to a right-side driving lane; L is for flashing the left turn signal to turn to left; H(1) is for changing the brightness of the headlamp from meeting beam (low beam) to driving beam (high beam); and H(2) is for changing the brightness of the headlamp from driving beam to meeting beam.

Figure 35:
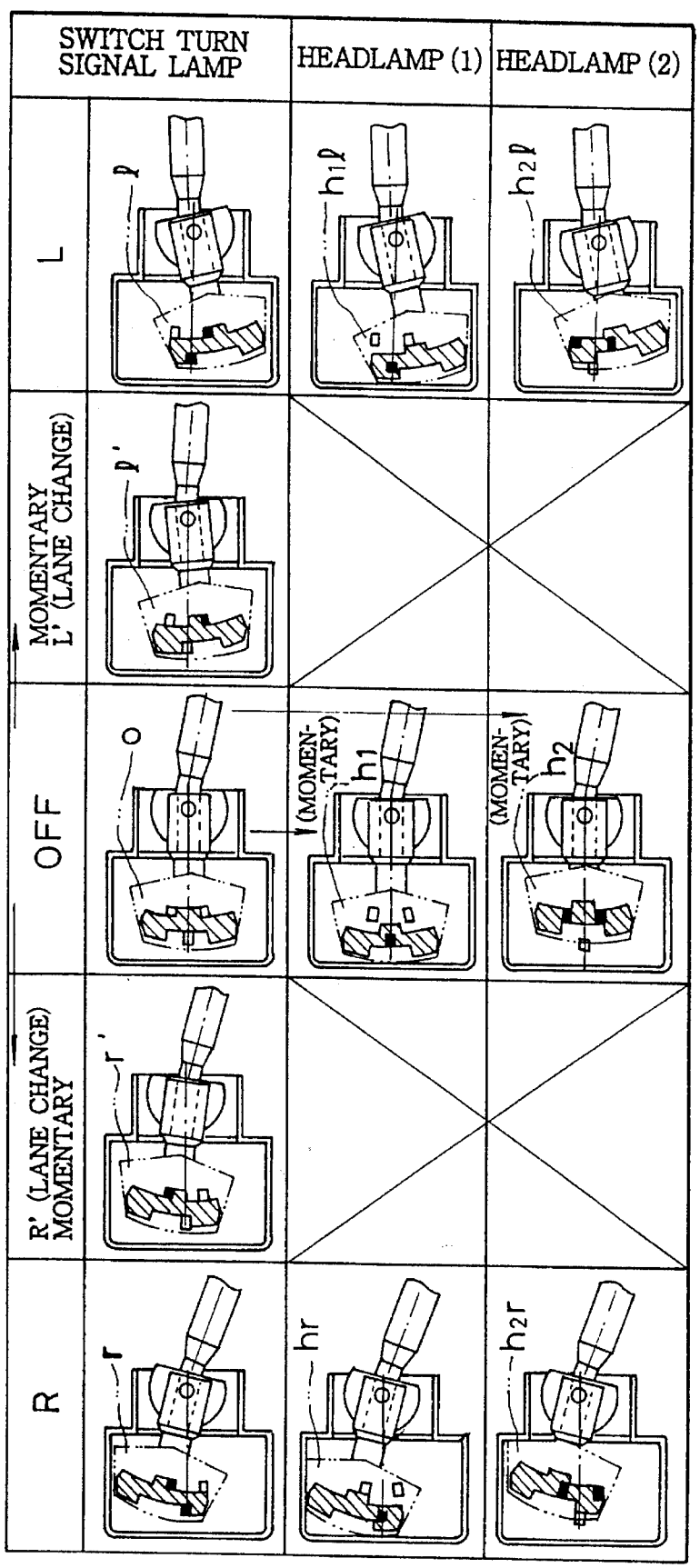
FIG. 35 is a view for use In describing relative position between a sensor assembly and an output pattern generating assembly in accordance with the fourth embodiment of the present invention.

Relations among the functions, the sensors 17a through 17c and output patterns are shown in the logic table in FIG. 34. The relative positions for each function are shown in FIGS. 35 through 38C. FIG. 35 is a view for use in describing relations between the functions and the relative positions of the sensors shown in FIGS. 36A through 38C. The relative positions for operating the turn signal lamp are indicated in the upper row. The middle row contains the relative positions for the high beam while the relative positions depicted in the lower row are those for the low beam. In FIG. 35 through FIG. 38C, the sensors 17a, 17b and 17c are represented in either black or white. The black one corresponds to the above mentioned presence state or the ON state. On the other hand, the while one corresponds to the absence state or the OFF state. As mentioned above, the output pattern generating assembly 20 can be made in any preferable shape as long as the output patterns shown in the logic table in FIG. 34 can be obtained.

Figure 36A:
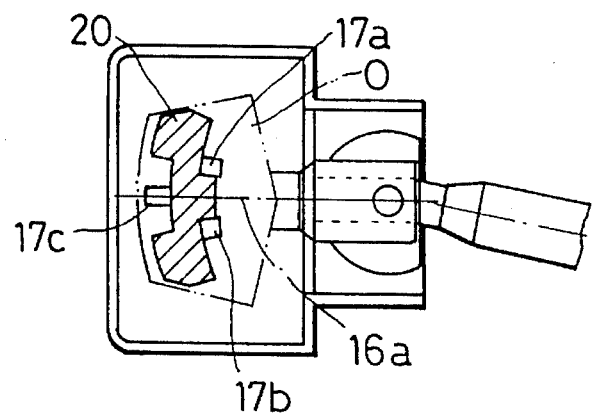
FIGS. 36A through 36E are views for use in describing relative position between a sensor assembly and an output pattern generating assembly in accordance with the fourth embodiment of the present invention.
Figure 36B:
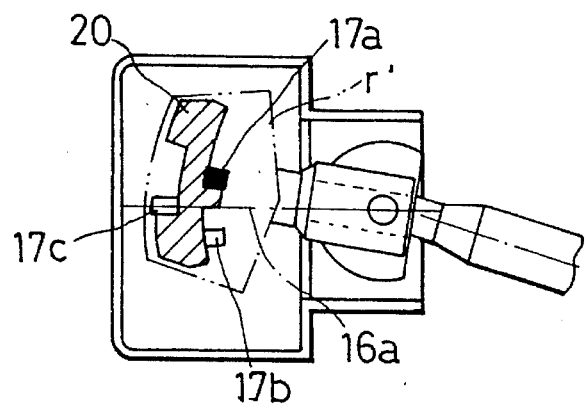
Figure 36C:
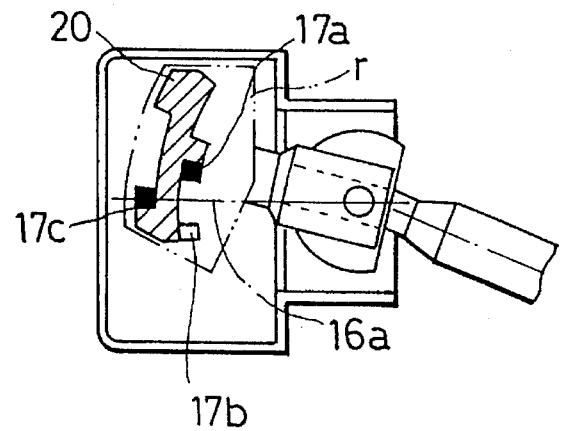
Figure 36D:
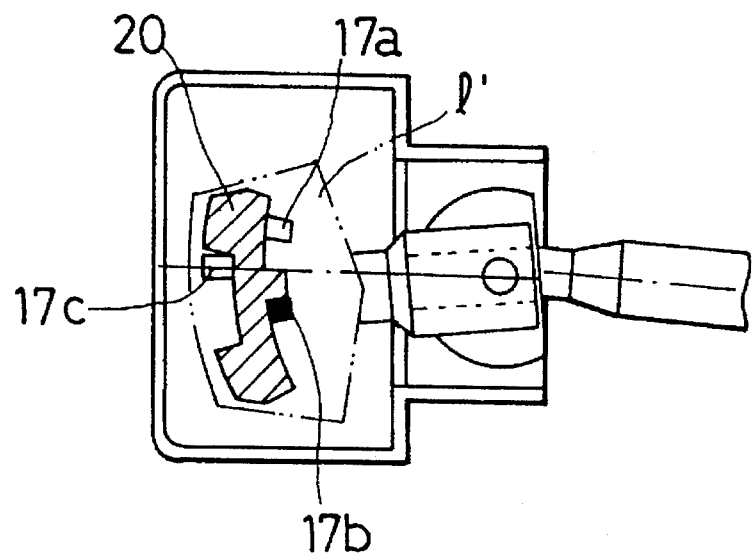
Figure 36E:
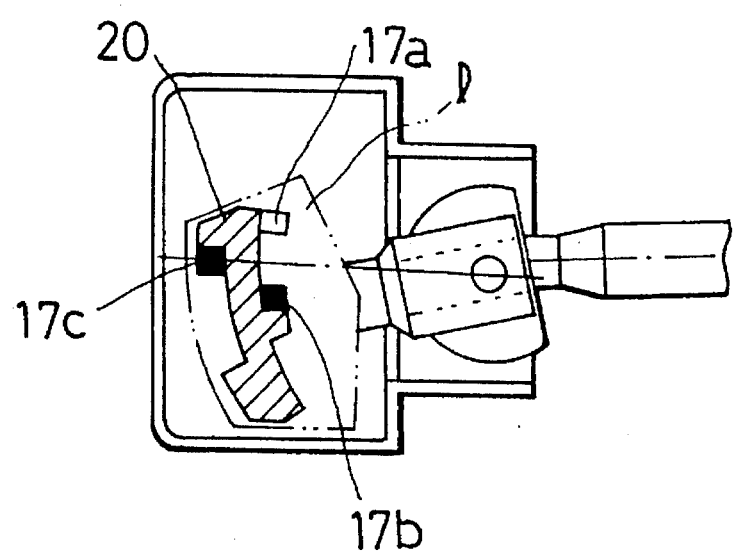

FIG. 36A shows the relative position when the switch lever 13 is in the OFF state. The right and left halves of the output pattern generating assembly 20 are placed symmetrically about the central axis 16a. This is shown in the third block from the left in the upper row in FIG. 35. FIG. 36B shows the relative position for R' (to change the driving lane to right). In this figure, the relative position is shifted to right compared with that in FIG. 36A with respect to the central axis 16a. By further shifting the position to right as shown in FIG. 36C, the output pattern generating assembly 20 produces the output pattern indicative of the position R to flash the right turn signal. Similarly FIGS. 36D and 36E are views showing the relative positions for the switch positions L' and L.

Figure 37A:
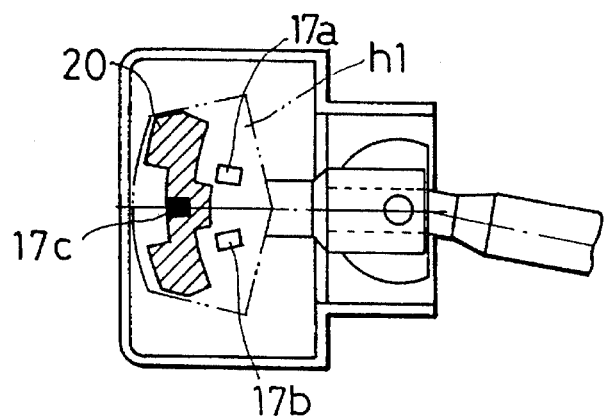
FIGS. 37A through 37C are view for use in describing relative position between a sensor assembly and an output pattern generating assembly in accordance with the fourth embodiment of the present invention.
Figure 37B:
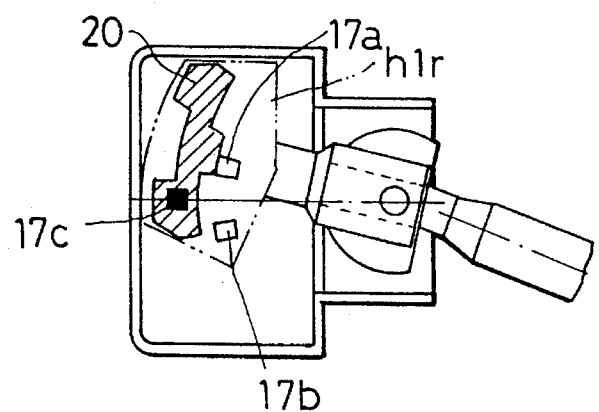
Figure 37C:
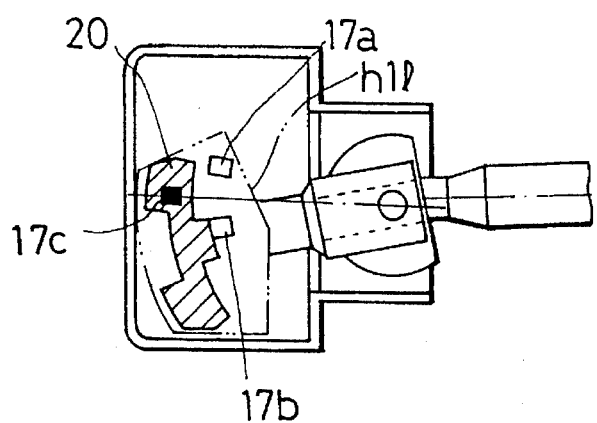

FIGS. 37A through 37C are similar views as illustrated in the middle row in FIG. 35. When the switch lever 13 is turned from the neutral or the OFF state to the position H(1), the output pattern generating assembly 20 advances to the position shown in FIG. 37A. If the switch lever 13 is already shifted to the position R and further turned to the position H(1), the output pattern generating assembly 20 advances to the position shown in FIG. 37B (which is also shown in the column R of the middle row in FIG. 35). On the other hand, if the switch lever 13 is already shifted to the position L and further turned to the position (H1), the output pattern generating assembly 20 advances to the position shown in FIG. 37C (which is also shown in the column L of the middle row in FIG. 35).

Figure 38A:
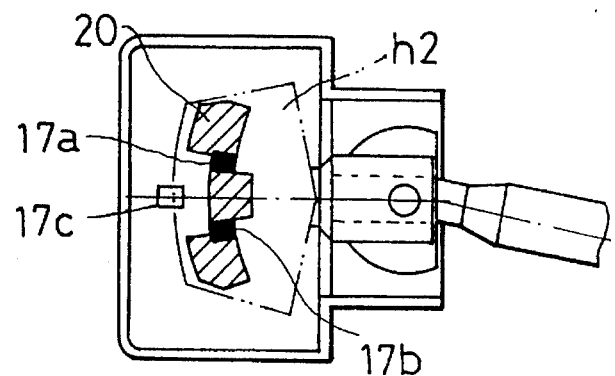
FIGS. 38A through 38C are views for use in describing relative position between a sensor assembly and an output pattern generating assembly in accordance with the fourth embodiment of the present invention.
Figure 38B:
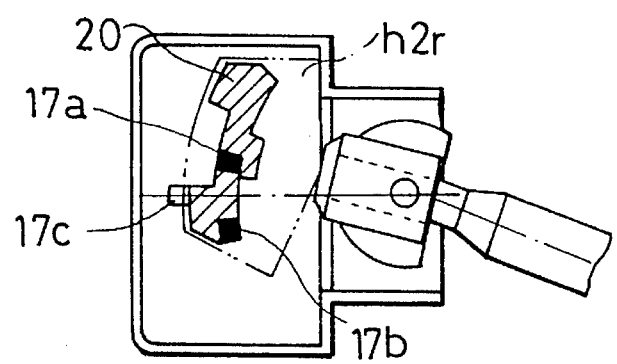
Figure 38C:
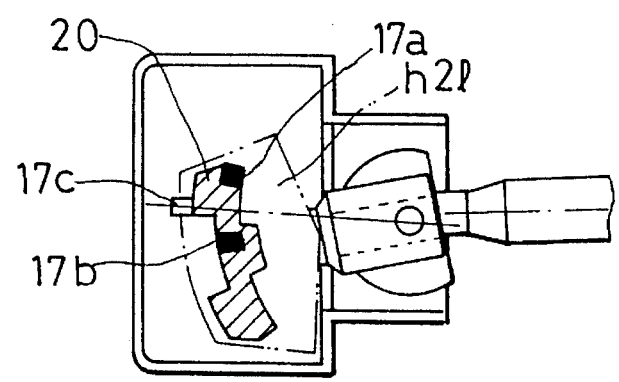

FIGS. 38A through 38C are similar views as illustrated in the lower row in FIG. 35. When the switch lever 13 is turned from the neutral or the OFF state to the position H(2), the output pattern generating assembly 20 retreats to the position shown in FIG. 37A. If the switch ever 13 is already shifted to the position R and further turned to the position H(2), the output pattern generating assembly 20 retreats to the position shown in FIG. 38B. On the other hand, if the switch lever 13 is already shifted to the position L and further turned to the position (H2), the output pattern generating assembly 20 retreats to the position shown in FIG. 38C. When the switch lever 13 is shifted to or turned to either one of the positions R'L' H(1) and H(2) from the OFF position, the output pattern generating assembly 20 is momentarily shifted to the corresponding positions and the lever 13 will automatically return to the OFF state. In addition, three different positions are possible as the relative position of the output pattern generating assembly 20 for each of the H(1) and H(2), depending on the previous position thereof.

In case where the switch lever 13 is in the position R or L and is further turned to the position H(1) or H(2), the logic pattern generated by the sensors 17a through 17c is changed. The latest output pattern indicates to change the brightness of the headlamp. In other words, the latest output pattern no more indicates to flash the right or left turn signal but in practice it sometimes becomes necessary to change the brightness of the headlamp or passing it during the turn signal lamp is flashing. The output patterns for the positions R and L are electrically stored until the output pattern indicates the OFF state of all sensors 17a through 17c. Flashing operation of the right or the left turn signal concludes when the processing circuit 43 determines that all sensors 17a through 17c are in the OFF state. The present embodiment applies the momentary mechanism in addition to the constant mechanism to improve the operability.

Fifth Embodiment

Figure 39:
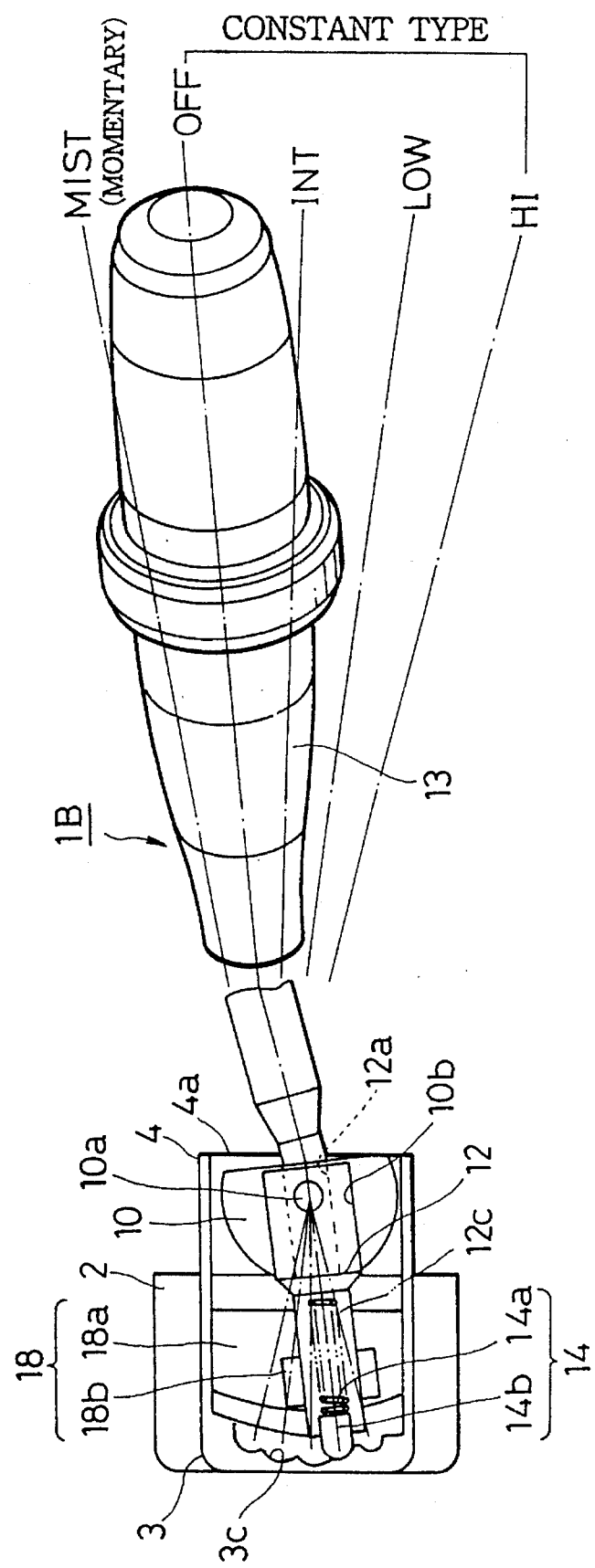
FIG. 39 is a plan view of a combination switch according to a fifth embodiment of the present invention.
Figure 40:
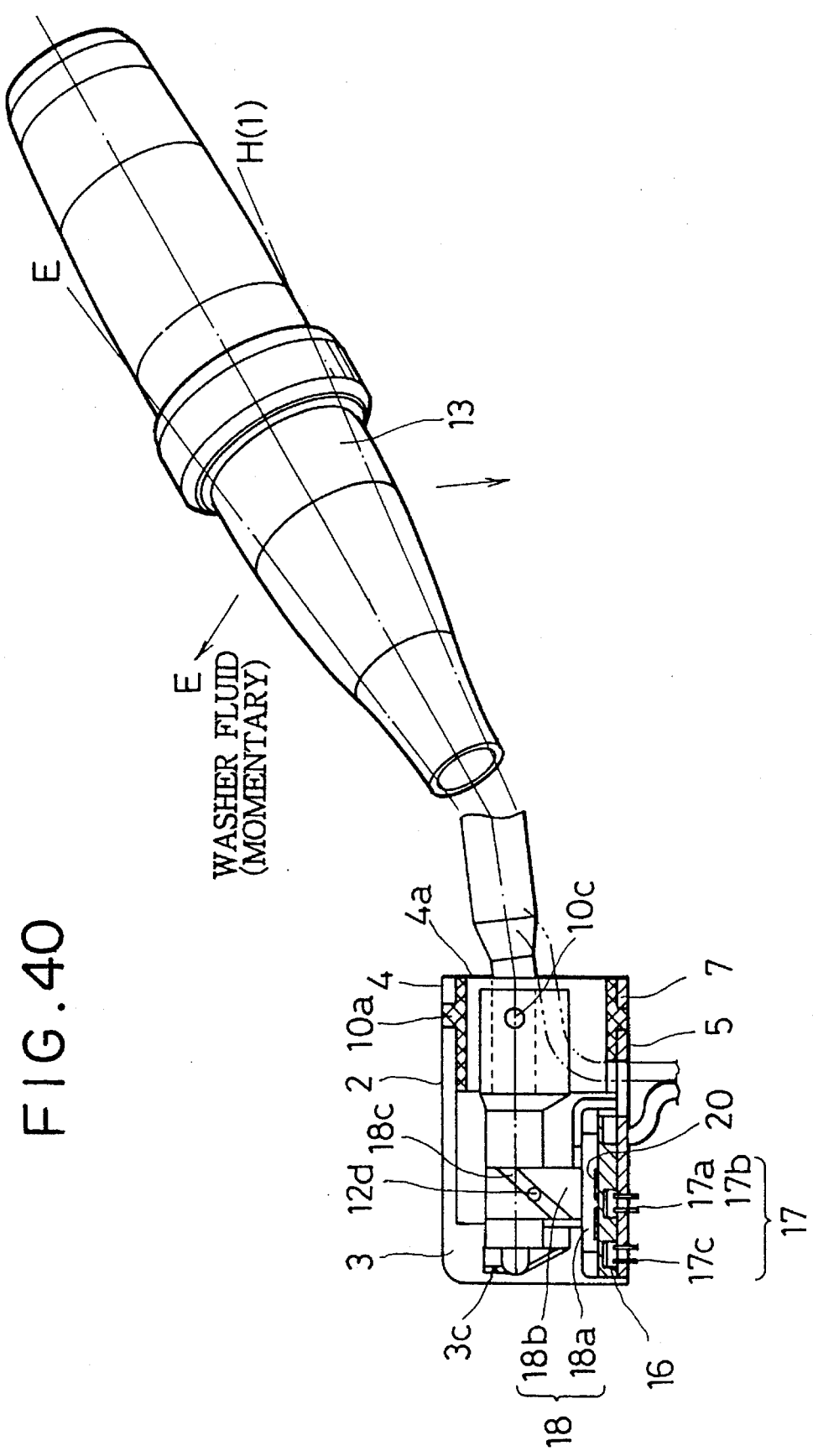
FIG. 40 is a front view of the combination switch illustrated in FIG. 39.

A fifth embodiment of the present invention will be described below with reference to FIGS. 39 through 43I. In this embodiment, the combination switch according to the present invention is applied to a windshield wiper & windshield washer controlling switch of constant type for a motor vehicle as shown in FIGS. 39 and 40. This combination switch is adapted to six different functions with three sensors. The number of relative positions given by these three sensors is nine.

This embodiment concerns with a switch body 1B and a processor 40B which comprise similar parts designated by like reference numerals as in FIGS. 32 and 33. Description of such parts is also omitted here. The switch positions are represented by MIST, OFF, INT, LOW, HI and E. These positions correspond to the functions: MIST is for the "mist-wipers" to reciprocate the wipers only one time; OFF is the neutral or off state; INT is for intermittently operating the windshield wipers; LOW is for operating the windshield wipers at relatively low speed; HI is for operating the windshield wipers at relatively high speed; and E is for directing water or washer fluid to the entire swept area of the windshield.

Figure 42:
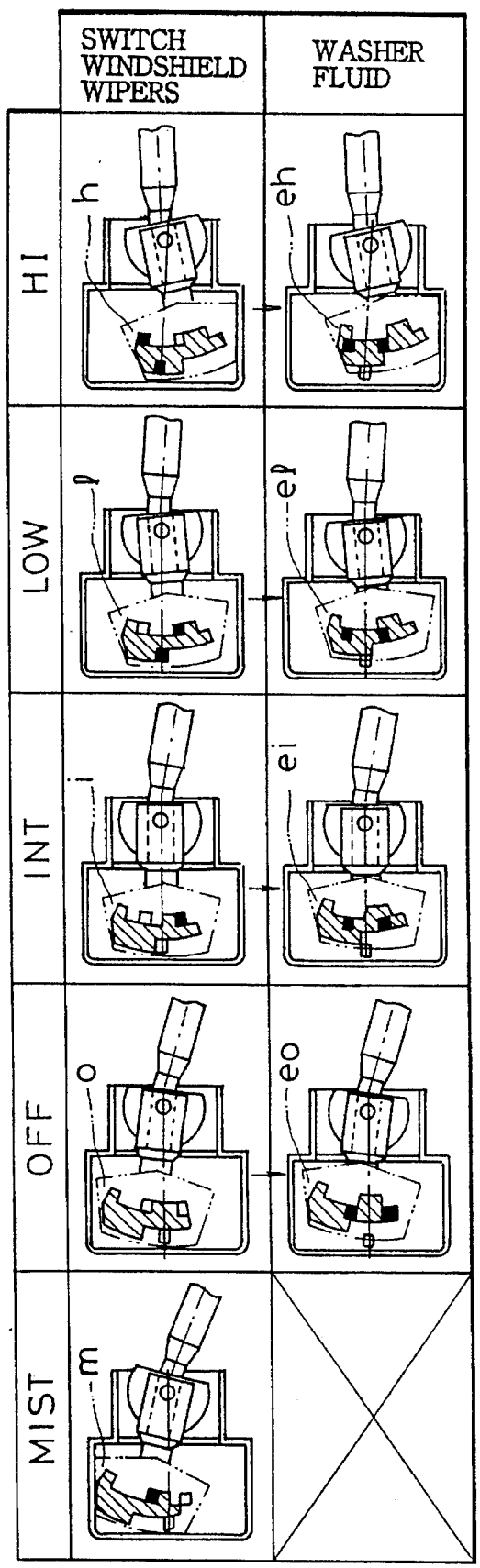
FIG. 42 is a view for use in describing relative position between a sensor assembly and an output pattern generating assembly in accordance with the fifth embodiment of the present invention.
Figure 43A:
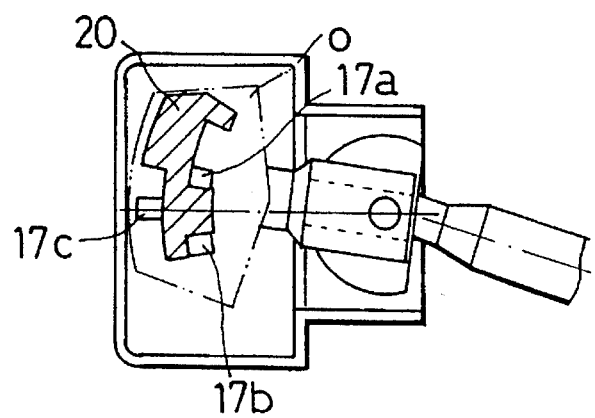
FIGS. 43A through 43I are views for use in describing relative position between a sensor assembly and an output pattern generating assembly in accordance with the fifth embodiment of the present invention.
Figure 43B:
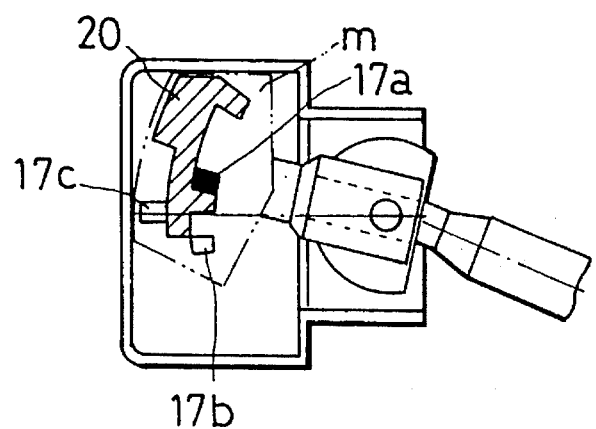
Figure 43C:
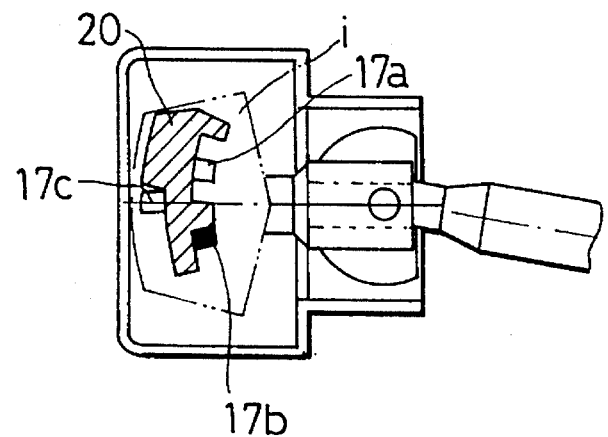
Figure 43D:
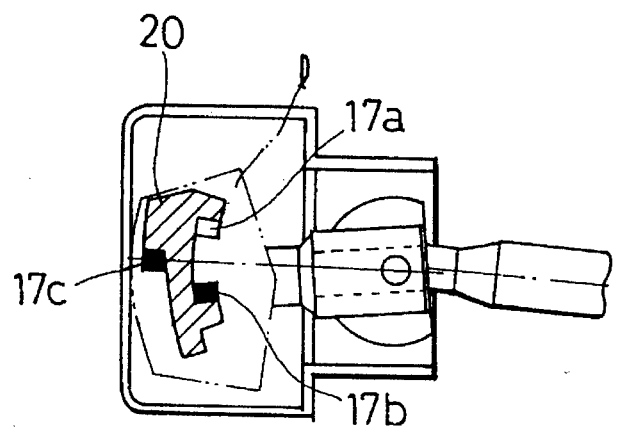
Figure 43E:
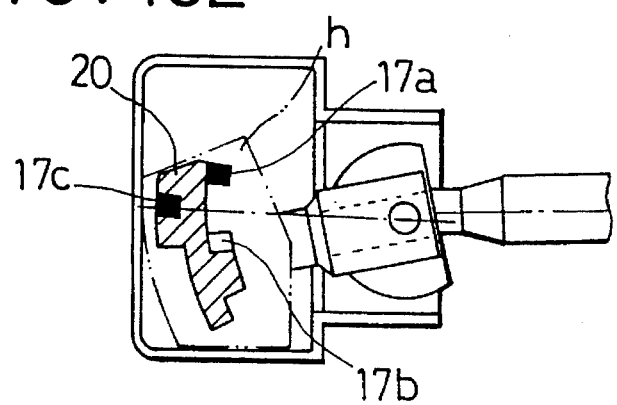
Figure 43F:
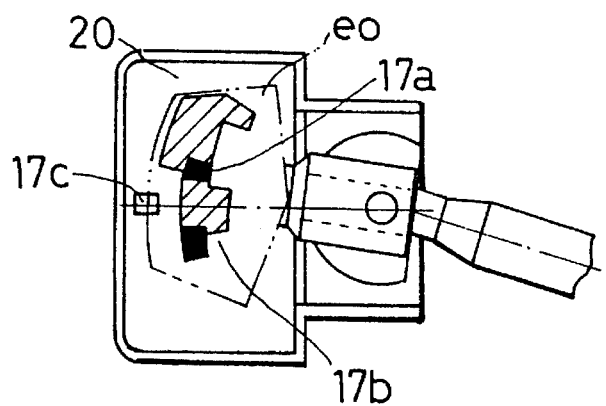
Figure 43G:
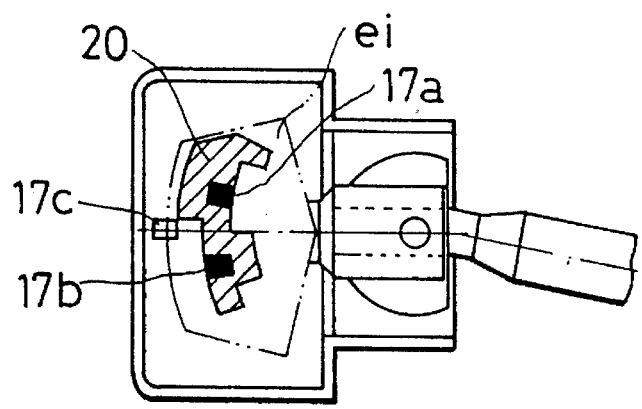
Figure 43H:
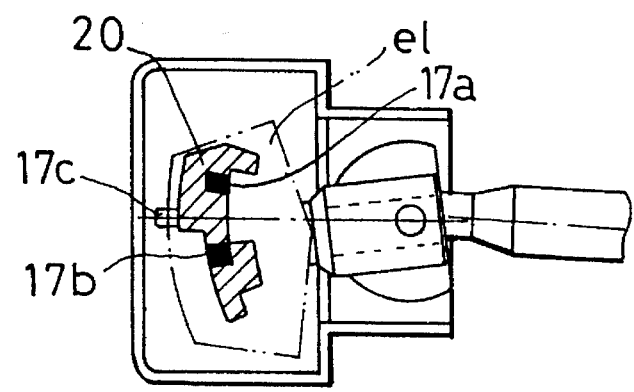
Figure 43I:
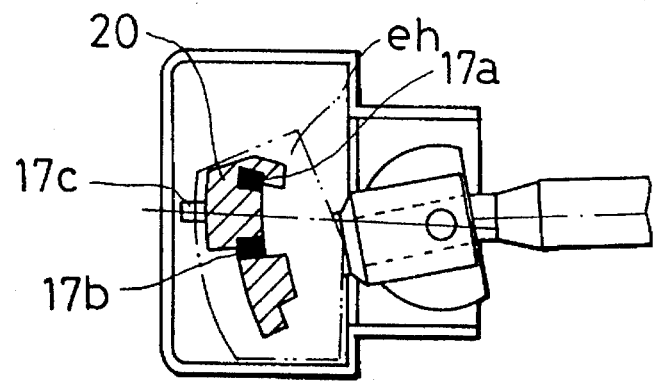

Relations among the functions, the sensors 17a through 17c and output patterns are shown in the logic table in FIG. 41. The relative positions for each function are shown in FIGS. 42 through 43I. FIG. 42 is a view for use in describing relations between the functions and the relative positions of the sensors shown in FIGS. 43A through 43I. The relative positions for operating the windshield wipers without directing the washer fluid are shown in the upper row in FIG. 42. The relative positions depicted in the lower row are those for operating the windshield wipers with water or washer fluid. FIG. 43A shows the relative position of the output pattern generating assembly 20 when the switch lever 13 is in the OFF state. FIG. 43B shows the relative position when the switch lever 13 is in the position of MIST. FIG. 43C illustrates the relative position for the INT position while FIGS. 43D and 43E illustrate those for the LOW and HI positions. FIGS. 43F through 43I show the relative positions to operate the windshield wipers with the washer fluid. When the switch lever 13 is shifted to the position E from the OFF position, then the relative position of the output pattern generating assembly 20 is as shown in FIG. 43F. If the previous position of the switch lever 13 is INT, then the relative position of the output pattern generating assembly 20 becomes as shown in FIG. 43G. The relative position from the lever positions LOW and HI to E are as shown in FIGS. 43H and 43I, respectively. Shifting to the position E is momentarily made as well known in the art achieved by four different positions of the output pattern generating assembly 20.

The fifth embodiment is similar in operation to the above mentioned fourth embodiment so that further detailed description of this embodiment will be omitted. The operability of the combination switch can be extremely improved by means of adapting the momentary mechanism in addition to the constant mechanism depending on necessity.

While the present invention has thus been described in conjunction with the preferred embodiments thereof, it is readily understood by those skilled in the art that various modifications can be possible without departing from the spirit and scope of the present invention. For example, the highly reflective non-contact sensors are used as the sensor assembly though the Hall element can be equally used as the non-contact sensor assembly. In order to overcome the problems of the contact failure, it is preferable to use a non-contact sensor. Any one of the available non-contact sensor can be equally applied to the present invention. In this event, the detected assembly may be made of a ferromagnetic material.

In addition, various shapes and arrangements of the output pattern generating assembly are exemplified above but not limited thereto. It is possible to made the output pattern generating assembly in other shape at other arrangement.

What is claimed is:

1. A combination switch for performing various functions, comprising:

a first substrate having a plurality of non-contact sensors;

a second substrate arranged in a parallel with said first substrate, said second substrate including a detected assembly to be detected by said non-contact sensor;

operational means for moving said second substrate with respect to said first substrate to move the position of said detected assembly relative to said sensor, thereby selectively detecting said detected assembly with said sensors thereby outputting a detection signal on detecting said detected assembly, said detection signal corresponding to one of a plurality of different output patterns from said detected assembly; and a processor for inputting said detection signal and selecting a function corresponding to said detection signal and outputting an operational signal corresponding to said selected function for performing said selected function;

wherein the number of said sensors is established to be a minimum of said sensors with which logic patterns can be combined in relation to the number of said various functions desired.

2. A combination switch according to claim 1, wherein said first substrate consists of a fixed substrate.

3. A combination switch according to claim 1, wherein said second substrate consists of a movable substrate.

4. A combination switch as claimed in claim 1, wherein each of said non-contact sensors includes a light emitting unit for emitting light to said detected assembly and a photo detecting unit for detecting the reflected light from said detected assembly.

5. A combination switch according to claim 4, wherein said detected assembly consists of a metal plate for reflecting said light emitted from said light emitting unit.

6. A combination switch according to claim 1, wherein each of said non-contact sensors consists of Hall elements and said detected assembly is made of a ferromagnetic material.

7. A combination switch according to claim 1, wherein said operational means includes a lever.

8. A combination switch according to claim 1, wherein said processor includes a logic circuit for judging to which function said output pattern corresponds.

* * * * *